US008039105B2

(12) United States Patent
Meier et al.

(10) Patent No.: US 8,039,105 B2
(45) **Date of Patent: *Oct. 18, 2011**

(54) AMORPHOUS SUBMICRON PARTICLES

(75) Inventors: Karl Meier, Alfter (DE); Ulrich Brinkmann, Bornheim (DE); Christian Panz, Wesseling-Berzdorf (DE); Doris Misselich, Erftstadt (DE); Christian Goetz, Bonn (DE)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/840,816

(22) Filed: Jul. 21, 2010

(65) Prior Publication Data

US 2010/0285317 A1 Nov. 11, 2010

Related U.S. Application Data

(62) Division of application No. 11/872,955, filed on Oct. 16, 2007, now Pat. No. 7,850,102.

(60) Provisional application No. 60/940,615, filed on May 29, 2007.

(30) Foreign Application Priority Data

Oct. 16, 2006 (DE) ........................ 10 2006 048 850

(51) Int. Cl.
*B32B 5/66* (2006.01)

(52) U.S. Cl. ......... 428/402; 428/331; 423/335; 423/339

(58) Field of Classification Search .................. 428/402, 428/331; 423/335, 339
See application file for complete search history.

(56) References Cited

U.S. PATENT DOCUMENTS

| | | | | |
|---|---|---|---|---|
| 2,856,268 | A | 10/1958 | Young | |
| 3,367,742 | A * | 2/1968 | Teicher et al. | 423/335 |
| 7,767,180 | B2 * | 8/2010 | Panz et al. | 423/339 |

FOREIGN PATENT DOCUMENTS

| | | | |
|---|---|---|---|
| EP | 0 139 279 | A2 | 5/1985 |
| EP | 1 419 823 | A2 | 5/2004 |

* cited by examiner

*Primary Examiner* — Leszek Kiliman
(74) *Attorney, Agent, or Firm* — Oblon, Spivak, McClelland, Maier & Neustadt, L.L.P.

(57) ABSTRACT

A process for milling amorphous solids using a milling apparatus can result in particles having a median particle diameter $d_{50}$ of <1.5 μm. The process includes: operating a mill in a milling phase with an operating medium selected from the group consisting of gas, vapor, steam, a gas containing steam and mixtures thereof, and heating a milling chamber in a heat-up phase before the actual operation with the operating medium in such a way that a temperature in the milling chamber, the mill exit or both, is higher than a dew point of the operating medium.

6 Claims, 10 Drawing Sheets

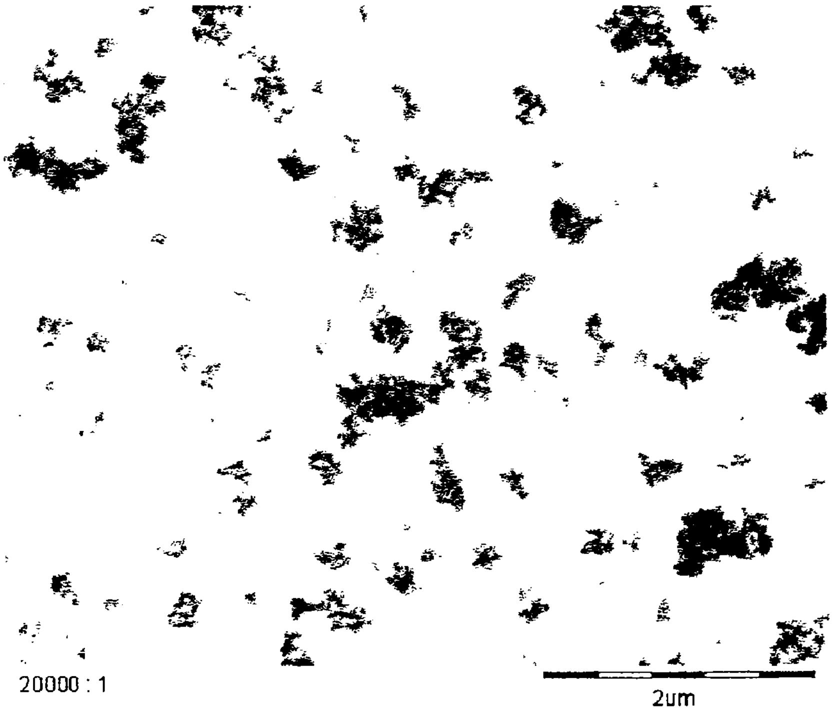
Figure 5: Transmission electron micrograph of Example 1
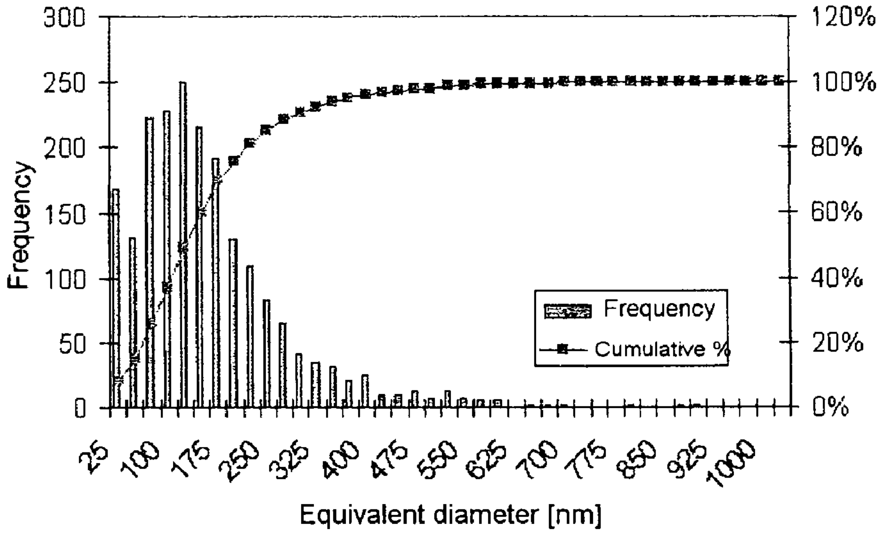
Figure 6: Histogram of the equivalent diameters of Example 1

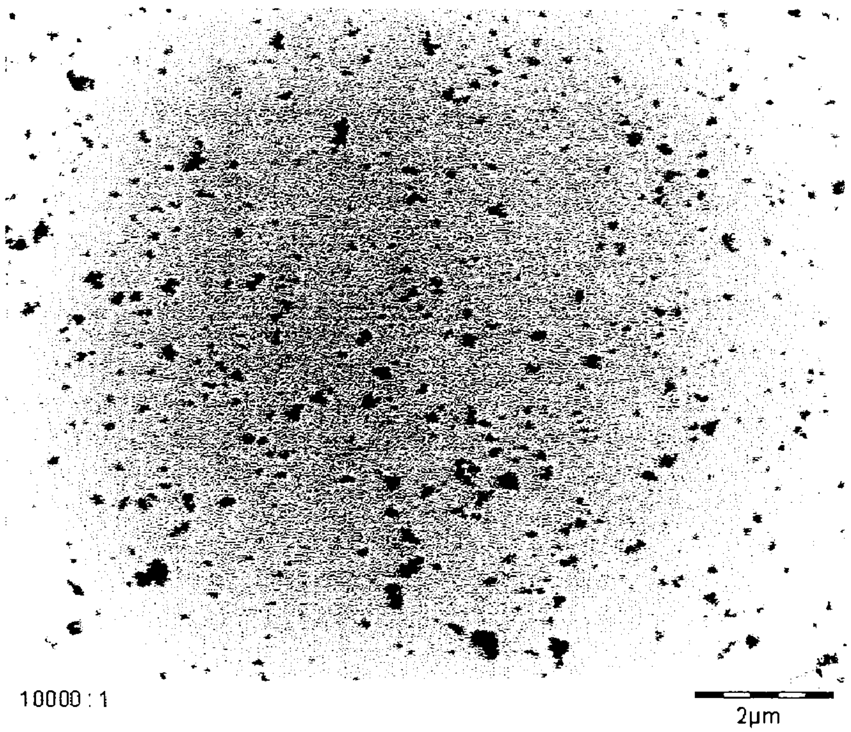
Figure 7: Transmission electron micrograph of Example 2
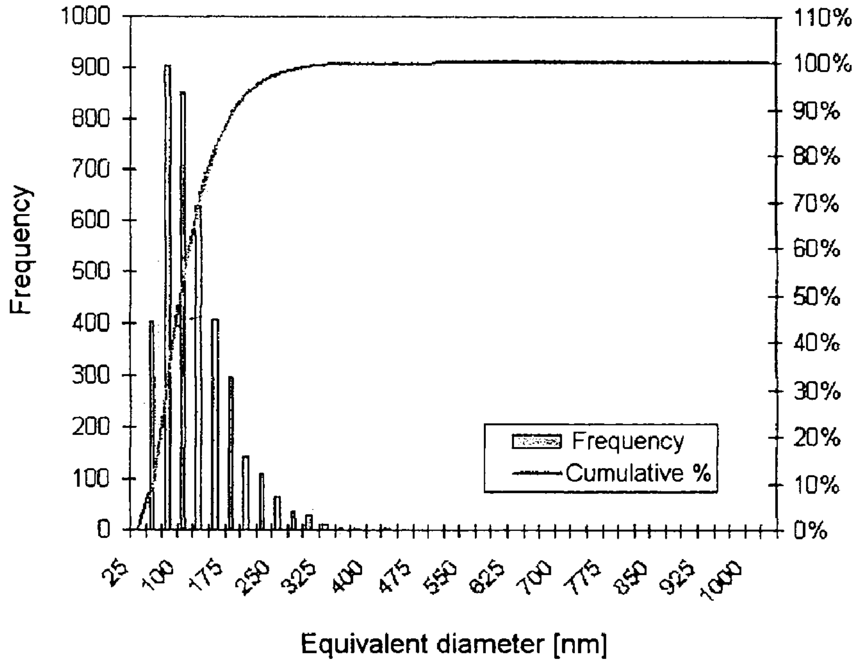
Figure 8: Histogram of the equivalent diameters of Example 2

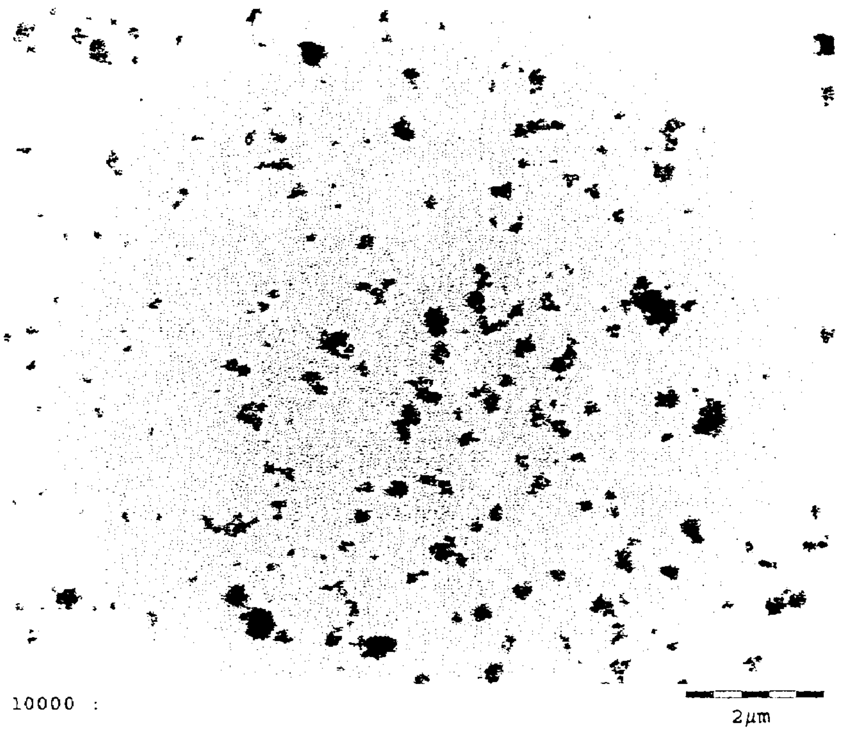
Figure 9: Transmission electron micrograph of Example 3a
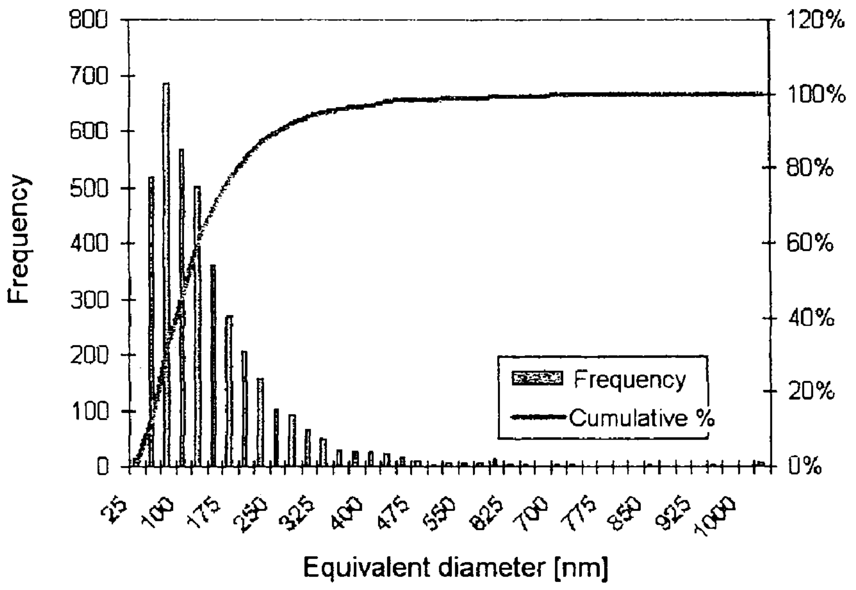
Figure 10: Histogram of the equivalent diameters of Example 3a

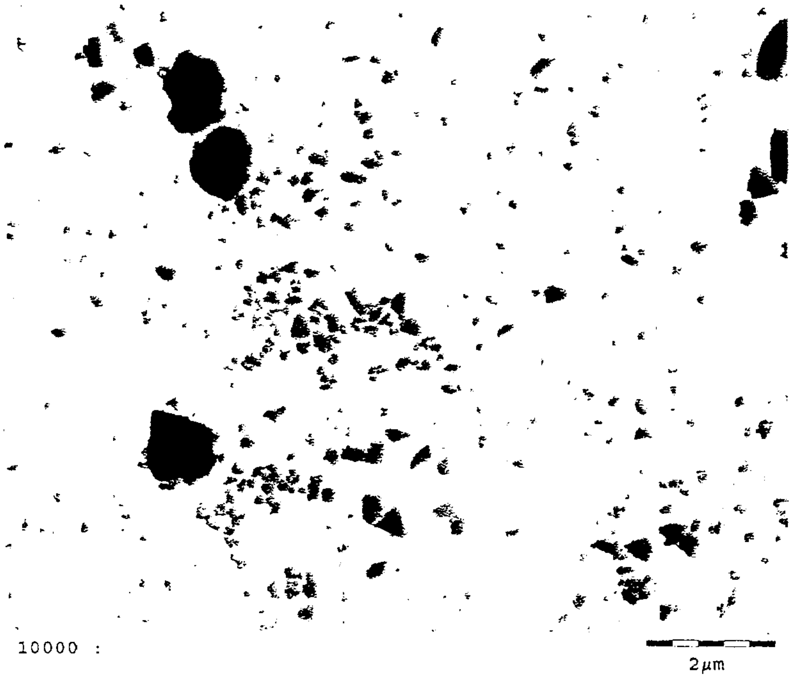
Figure 11: Transmission electron micrograph of Example 3b
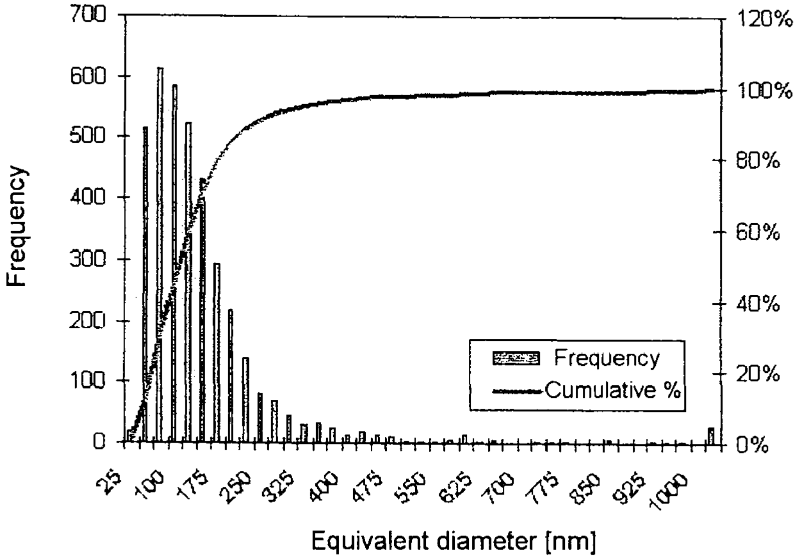
Figure 12: Histogram of the equivalent diameters of Example 3b

AMORPHOUS SUBMICRON PARTICLES

BACKGROUND OF THE INVENTION

1. Field of the Invention

The invention relates to pulverulent amorphous solids having a very small median particle size and a narrow particle size distribution, a process for the preparation thereof and the use thereof.

2. Discussion of the Background

Finely divided, amorphous silica and silicates have been produced industrially for decades. As a rule, the very fine milling is carried out in spiral jet mills or opposed jet mills using compressed air as milling gas, e.g. EP 0139279.

It is known that the achievable particle diameter is proportional to the square root of the inverse of the impact velocity of the particles. The impact velocity in turn is predetermined by the jet velocity of the expanding gas jets of the respective milling medium from the nozzles used. For this reason, superheated steam can preferably be used for generating very small particle sizes, since the acceleration power of steam is about 50% greater than that of air. However, the use of steam has the disadvantage that condensation may occur in the entire milling system, particularly during the startup of the mill, which as a rule results in the formation of agglomerates and crusts during the milling process.

The median particle diameters $d_{50}$ achieved with the use of conventional jet mills in the milling of amorphous silica, silicates or silica gels have therefore been substantially above 1 μm to date. Thus, for example, U.S. Pat. No. 3,367,742 describes a process for milling aerogels, in which aerogels having a median particle diameter of 1.8 to 2.2 μm are obtained. Milling to a median particle diameter of less than 1 μm is, however, not possible with this technique. Furthermore, the particles of U.S. Pat. No. 3,367,742 have a broad particle size distribution with particle diameters of 0.1 to 5.5 μm and a fraction of 15 to 20% of particles >2 μm. A large fraction of large particles, i.e. >2 μm, is disadvantageous for applications in coating systems since as a result thin coats having a smooth surface cannot be produced. U.S. Pat. No. 2,856,268 describes the combined milling and drying of silica gels in vapour jet mills. However, the median particle diameters achieved thereby were substantially above 2 μm.

An alternative possibility for milling is wet comminution, e.g. in ball mills. This leads to very finely divided suspensions of the products to be milled, cf. for example WO 200002814. It is not possible with the aid of this technology to isolate a finely divided, agglomerate-free dry product from these suspensions, in particular without changing the porosymmetric properties.

SUMMARY OF THE INVENTION

It was therefore an object of the present invention to provide novel finely divided, pulverulent, amorphous solids and a process for the preparation thereof.

Further objects not specified in detail arise from the overall context of the description and of the claims and examples.

This and other objects have been achieved by the present invention the first embodiment of which includes a process for milling amorphous solids using a milling apparatus, comprising:

operating a mill in a milling phase with an operating medium selected from the group consisting of gas, vapour, steam, a gas containing steam and mixtures thereof, and heating a milling chamber in a heat-up phase before the actual operation with the operating medium in such a way that a temperature in the milling chamber, the mill exit or both, is higher than a dew point of the operating medium.

In another embodiment, the present invention includes amorphous pulverulent solids having a median particle size $d_{50}$ (TEM) of <1.5 μm and/or a $d_{90}$ value (TEM) of <2 μm and/or a $d_{99}$ value (TEM) of <2 μm.

In yet another embodiment, the present invention includes a coating system, comprising: at least one of the above amorphous solids.

Figure 2A:
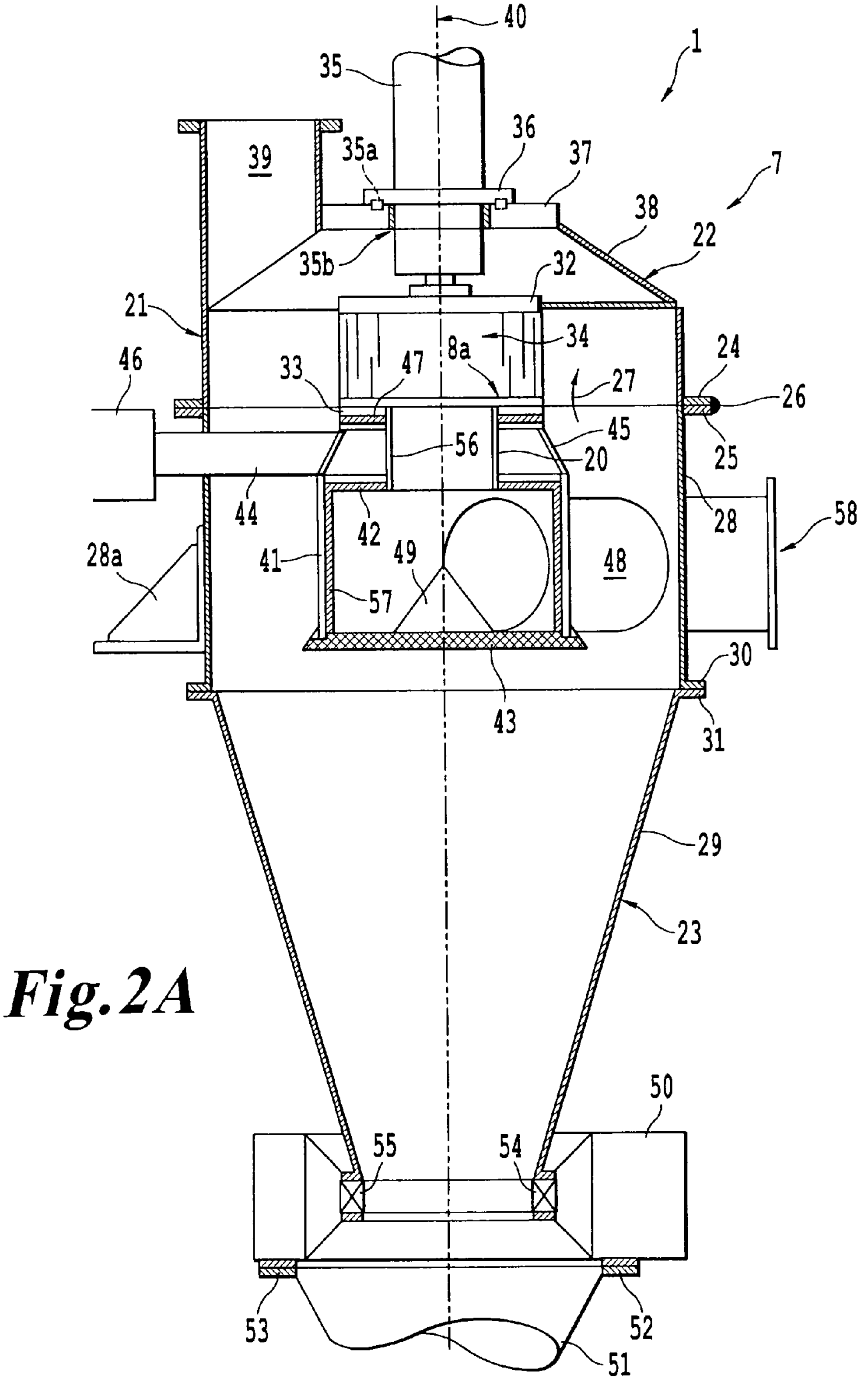
FIG. 2 shows a working example of an air classifier of a jet mill in vertical arrangement and as a schematic middle longitudinal section, the outlet tube for the mixture of classifying air and solid particles being coordinated with the classifying wheel.
Figure 2B:
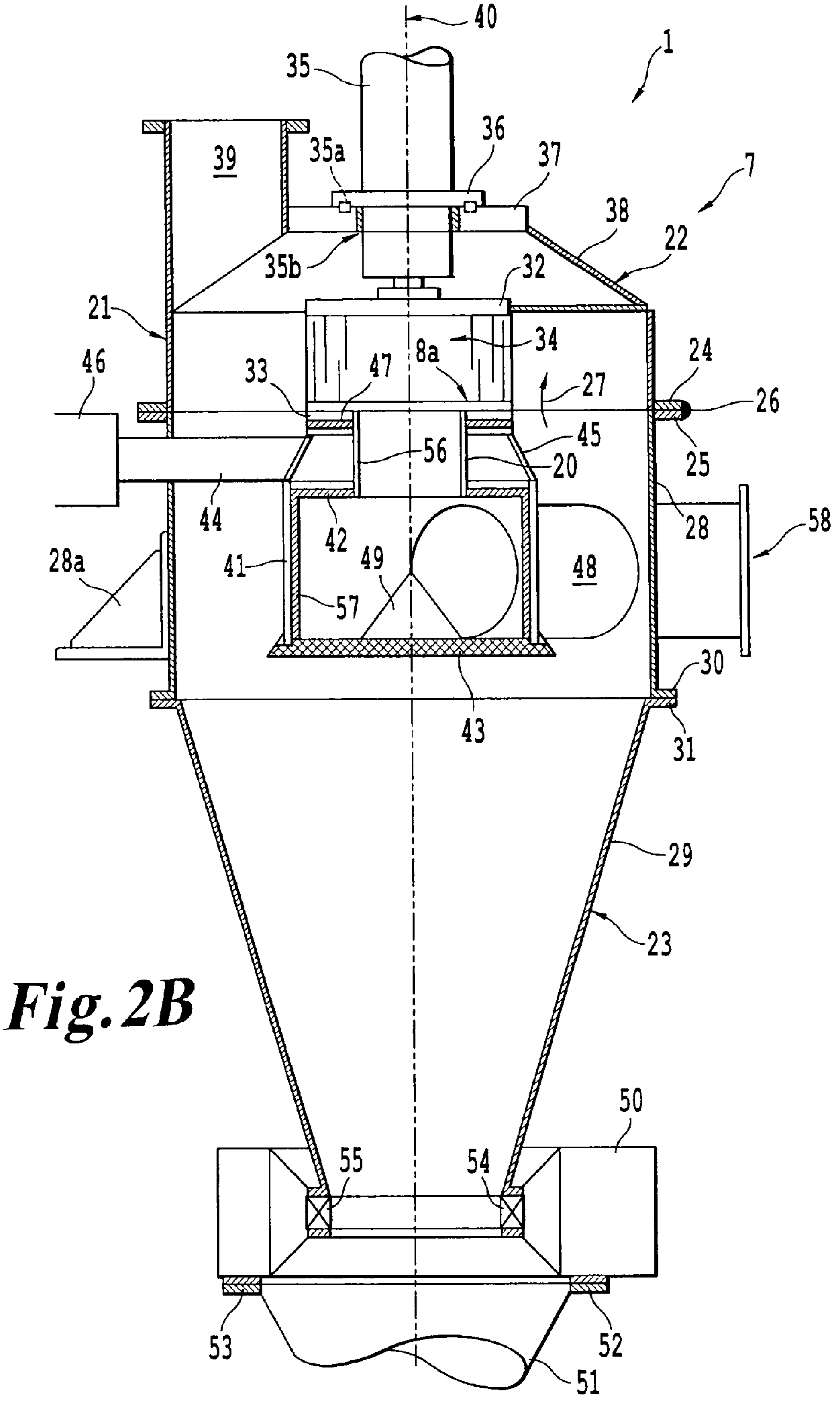

FIG. **2*a* shows a working example of an air classifier analogous to FIG. 2 but with flushing of classifier gap 8*a* and shaft lead-through 35*b***.

Figure 3A:
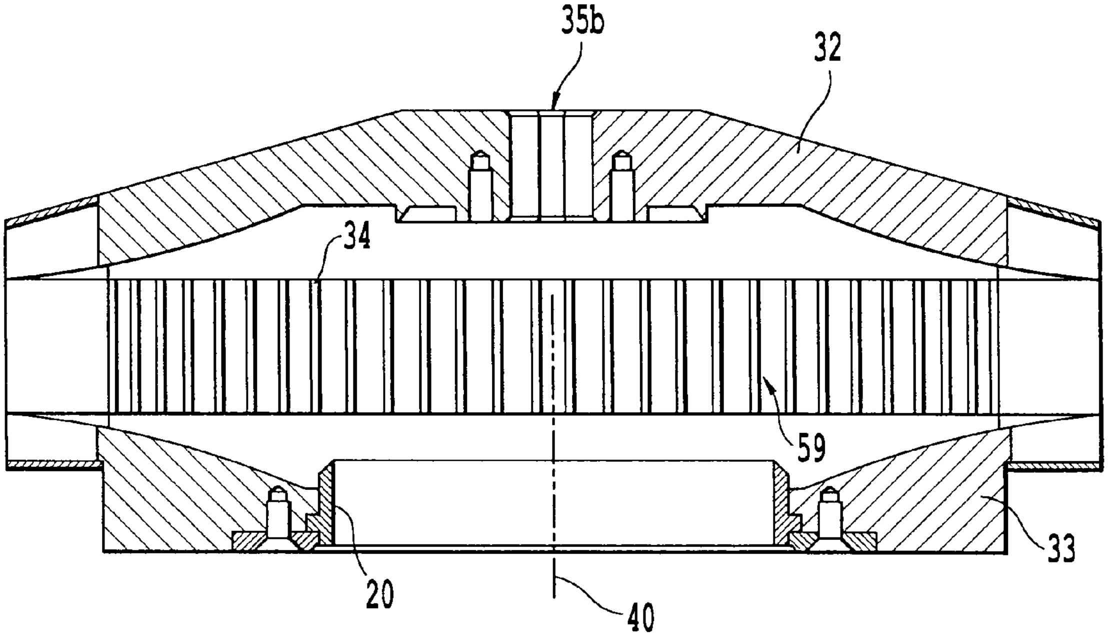
Figure 3B:
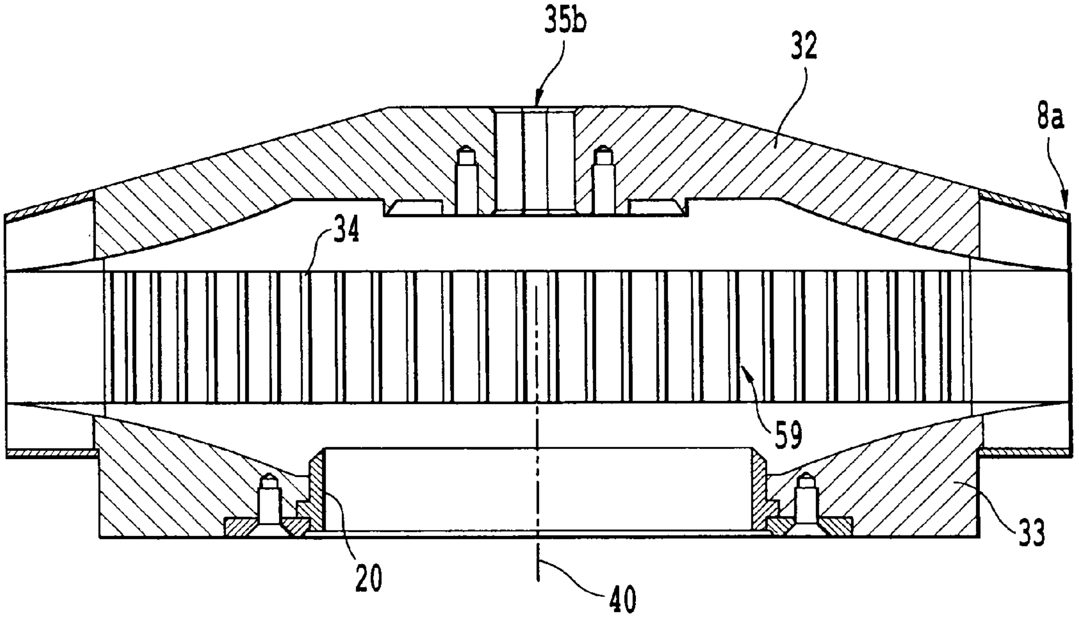

FIG. 3 shows, in schematic representation and as a vertical section, a classifying wheel of an air classifier.

FIG. **3*a* shows, in schematic representation and as a vertical section, the classifying wheel of an air classifier analogous to FIG. 3 but with flushing of classifier gap 8*a* and shaft lead-through 35*b***.

Figure 4:
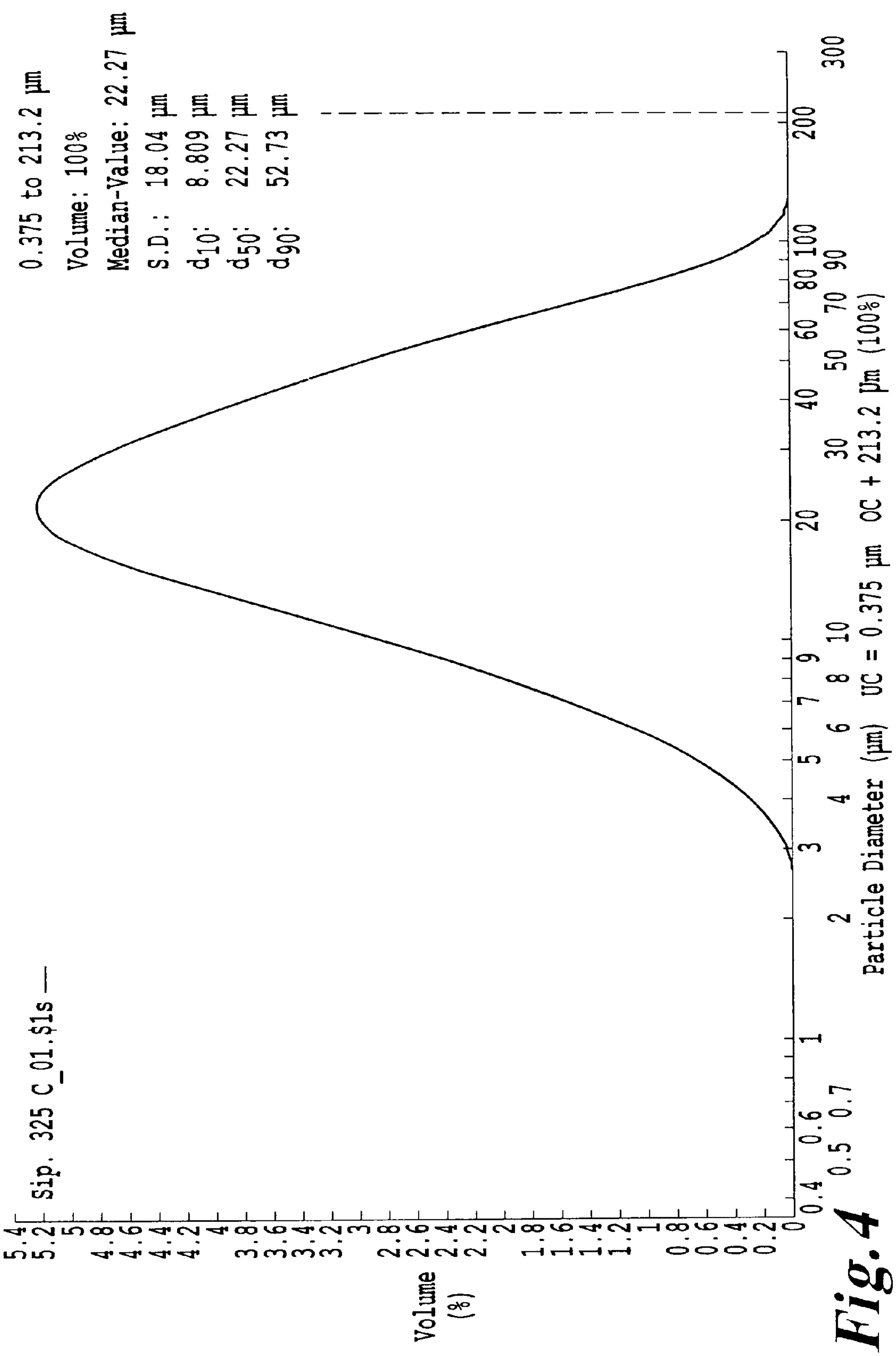

FIG. 4 shows the particle distribution of silica 1 (unmilled).

FIG. 5 shows a TEM of Example 1.

FIG. 6 shows a histogram of the equivalent diameter of Example 1.

FIG. 7 shows a TEM of Example 2.

FIG. 8 shows a histogram of the equivalent diameter of Example 2.

FIG. 9 shows a TEM of Example 3a.

FIG. 10 shows a histogram of the equivalent diameter of Example 3a.

FIG. 11 shows a TEM of Example 3b.

FIG. 12 shows a histogram of the equivalent diameter of Example 3b.

DETAILED DESCRIPTION OF THE INVENTION

The inventors of the present invention have surprisingly found that it is possible to mill amorphous solids by a process specified in more detail below to a median particle size $d_{50}$ of less than 1.5 μm and in addition to achieve a very narrow particle distribution.

One object is thus achieved by the process as defined in more detail in the claims and the following description and the amorphous solids specified in more detail there.

The invention consequently includes a process for milling amorphous solids by means of a milling system (milling apparatus), preferably comprising a jet mill, characterized in that the mill is operated in the milling phase with an operating medium selected from a group consisting of gas and/or vapour, preferably steam, and/or a gas containing steam, and in that the milling chamber is heated in a heat-up phase, i.e. before the actual operation with the operating medium, in such a way that the temperature in the milling chamber and/or at the mill exit is higher than the dew point of the vapour and/or operating medium.

Other subject matter comprises amorphous solids having a median particle size $d_{50}$ of <1.5 μm and/or a $d_{90}$ value of <2 μm and/or a $d_{99}$ value of <2 μm.

The amorphous solids may be gels but also those having a different structure, such as, for example, particles comprising agglomerates and/or aggregates. They are preferably solids containing or consisting of at least one metal and/or at least one metal oxide, in particular amorphous oxides of metals of the 3rd and 4th main group of the Periodic Table of the Elements. This applies both to the gels and to the other amorphous solids, in particular those containing particles comprising agglomerates and/or aggregates. Precipitated silicas, pyrogenic silicas, silicates and silica gels are particularly preferred, silica gels comprising hydrogels as well as aerogels as well as xerogels.

The present invention furthermore relates to the use of the amorphous solids according to the invention, having a median particle size $d_{50}$ of <1.5 μm and/or a $d_{90}$ value of <2 μm and/or a $d_{99}$ value of <2 μm, for example, in surface coating systems.

With the process according to the invention, it is possible for the first time to prepare pulverulent amorphous solids having a median particle size $d_{50}$ of <1.5 μm and a narrow particle size distribution, expressed by the $d_{90}$ value of <2 μm and/or the $d_{99}$ value of <2 μm.

The milling of amorphous solids, in particular those containing a metal and/or metal oxide, for example of metals of the 3rd and 4th main group of the Periodic Table of the Elements, such as, for example, precipitated silicas, pyrogenic silicas, silicates and silica gels, for achieving such small median particle sizes was possible to date only by means of wet milling. However, only dispersions could be obtained thereby. The drying of these dispersions led to reagglomeration of the amorphous particles so that the effect of the milling was partly cancelled out and median particle sizes $d_{50}$ of <1.5 μm and particle size distribution $d_{90}$ value of <2 μm could not be achieved in the case of the dried, pulverulent solids. In the case of the drying of gels, the porosity was also adversely affected.

Compared with the processes of the related art, in particular the wet milling, the process according to the invention has the advantage that it comprises dry milling which leads directly to pulverulent products having very small median particle size, which particularly advantageously may also have a high porosity. The problem of reagglomeration during drying is eliminated since no drying step downstream of the milling is required.

A further advantage of the process according to the invention in one of its preferred embodiments is that the milling can take place simultaneously with the drying so that, for example, a filter cake can be directly further processed. This saves an additional drying step and simultaneously increases the space-time yield.

In its preferred embodiments, the process according to the invention also has the advantage that no condensate or only very small amounts of condensate form in the milling system, in particular in the mill, when starting up the milling system. Consequently, no condensate forms in the milling system even during cooling and the cooling phase is substantially shortened. The effective machine run times can therefore be increased.

Finally, because no condensate or only very little condensate is formed in the milling system during startup, an already dried material to be milled is prevented from becoming wet again, with the result that the formation of agglomerates and crusts during the milling process can be prevented.

Owing to the very special and unique median particle sizes and particle size distributions, the amorphous pulverulent solids prepared by means of the process according to the invention have particularly good properties when used in surface coating systems, for example as rheology auxiliaries, in paper coating and in paints or finishes.

For example, because of the very small median particle size and in particular the low $d_{90}$ value and $d_{99}$ value, the products according to the invention make it possible to produce very thin coatings.

The present invention is described in detail below. Some terms used in the description as well as in the claims are defined beforehand.

The terms powder and pulverulent solids are used synonymously in the context of the present invention and designate in each case finely comminuted, solid substances comprising small dry particles, dry particles meaning that they are externally dry particles. Although these particles generally have a water content, this water is bound to the particles or in the capillaries thereof so strongly that it is not released at room temperature and atmospheric pressure. In other words, they are particulate substances detectable by optical methods and not suspensions or dispersions. Furthermore, they may be both surface-modified and non-surface-modified solids. The surface modification is preferably effected with carbon-containing coating materials and can take place both before and after the milling.

The solids according to the invention may be present as a gel or as particle-containing agglomerates and/or aggregates. Gel means that the solids are composed of a stable, three-dimensional, preferably homogeneous network of primary particles. Examples of these are silica gels.

Particle-containing aggregates and/or agglomerates in the context of the present invention have no three-dimensional network or at least no network of primary particles which extends over all the particles. Instead, they have aggregates and agglomerates of primary particles. Examples of this are precipitated silicas and pyrogenic silicas.

A description of the structural difference of silica gels compared with precipitated $SiO_2$ is to be found in Iler R. K., "The chemistry of Silica", 1979, ISBN 0-471-02404-X, Chapter 5, page 462, and in Figure. 3.25. The content of this publication is hereby incorporated by reference in the description of this invention.

The process according to the invention is carried out in a milling system (milling apparatus), preferably in a milling system comprising a jet mill, particularly preferably comprising an opposed jet mill. For this purpose, a feed material to be comminuted is accelerated in expanding gas jets of high velocity and comminuted by particle-particle impacts. Very particularly preferably used jet mills are fluidized-bed opposed jet mills or dense-bed jet mills or spiral jet mills. In the case of the very particularly preferred fluidized-bed opposed jet mill, two or more milling jet inlets are present in the lower third of the milling chamber, preferably in the form of milling nozzles, which are preferably present in a horizontal plane. The milling jet inlets are particularly preferably arranged at the circumference of the preferably round milling container so that the milling jets all meet at one point in the interior of the milling container. Particularly preferably, the milling jet inlets are distributed uniformly over the circumference of the milling container. In the case of three milling jet inlets, the space would therefore be 120° in each case.

In a preferred embodiment of the process according to the invention, the milling system (milling apparatus) comprises a classifier, preferably a dynamic classifier, particularly preferably a dynamic paddle wheel classifier, especially preferably a classifier according to FIGS. 2 and 3.

In a particularly preferred embodiment, a dynamic air classifier according to FIGS. 2*a* and 3*a* is used. This dynamic air classifier contains a classifying wheel and a classifying wheel shaft and a classifier housing, a classifier gap being formed between the classifying wheel and the classifier housing and a shaft lead-through being formed between the classifying wheel shaft and the classifier housing, and is characterized in that flushing of classifier gap and/or shaft lead-through with compressed gases of low energy is effected.

When using a classifier in combination with the jet mill operated under the conditions according to the invention, a limit is imposed on the oversize particles, the product particles ascending together with the expanded gas jets being passed from the centre of the milling container through the classifier, and the product which has a sufficient fineness then being discharged from the classifier and from the mill. Particles which are too coarse return to the milling zone and are subjected to further comminution.

In the milling system, a classifier can be connected as a separate unit downstream of the mill, but an integrated classifier is preferably used.

An essential feature of the process according to the invention is that a heat-up phase is included upstream of the actual milling step, in which heat-up phase it is ensured that the milling chamber, particularly preferably all substantial components of the mill and/or of the milling system on which water and/or steam could condense, is/are heated up so that its/their temperature is above the dew point of the vapour.

The heating up can in principle be effected by any heating method. However, the heating up is preferably effected by passing hot gas through the mill and/or the entire milling system so that the temperature of the gas is higher at the mill exit than the dew point of the vapour. Particularly preferably, it is ensured that the hot gas preferably sufficiently heats up all substantial components of the mill and/or of the entire milling system which come into contact with the steam.

The heating gas used can in principle be any desired gas and/or gas mixtures, but hot air and/or combustion gases and/or inert gases are preferably used. The temperature of the hot gas is above the dew point of the steam.

The hot gas can in principle be introduced at any desired point into the milling chamber. Inlets or nozzles are preferably present for this purpose in the milling chamber. These inlets or nozzles may be the same inlets or nozzles through which the milling jets are also passed during the milling phase (milling nozzles). However, it is also possible for separate inlets or nozzles (heating nozzles) through which the hot gas and/or gas mixture can be passed to be present in the milling chamber. In a preferred embodiment, the heating gas or heating gas mixture is introduced through at least two, preferably three or more, inlets and nozzles which are arranged in a plane and are arranged at the circumference of the preferably round mill container in such a way that the jets all meet at one point in the interior of the milling container. Particularly preferably, the inlets or nozzles are distributed uniformly over the circumference of the milling container.

During the milling, a gas and/or a vapour, preferably steam and/or a gas/steam mixture, is let down through the milling jet inlets, preferably in the form of milling nozzles, as operating medium. This operating medium has as a rule a substantially higher sound velocity than air (343 m/s), preferably at least 450 m/s. Advantageously, the operating medium comprises steam and/or hydrogen gas and/or argon and/or helium. It is particularly preferably superheated steam. In order to achieve very fine milling, it has proved particularly advantageous if the operating medium is let down into the mill at a pressure of 15 to 250 bar, particularly preferably of 20 to 150 bar, very particularly preferably 30 to 70 bar and especially preferably 40 to 65 bar. The operating medium also particularly preferably has a temperature of 200 to 800° C., particularly preferably 250 to 600° C. and in particular 300 to 400° C.

In the case of steam as an operating medium, i.e. particularly when the vapour feed pipe is connected to a steam source, it proves to be particularly advantageous if the milling or inlet nozzles are connected to a vapour feed pipe which is equipped with expansion bends.

Furthermore, it has proved to be advantageous if the surface of the jet mill has as small a value as possible and/or the flow paths are at least substantially free of projections and/or if the components of the jet mill are designed for avoiding accumulations. By these measures, deposition of the material to be milled in the mill can additionally be prevented.

The invention is explained in more detail merely by way of example with reference to the below-described preferred embodiments of the process according to the invention and the preferred and particularly suitable versions of jet mills and the drawings and descriptions of the drawings, i.e. it is not limited to these working examples and use examples or to the respective combinations of features within individual working examples.

Individual features which are stated and/or shown in relation to specific working examples are not limited to these working examples or the combination with the other features of these working examples but can be combined, within the technical possibilities, with any other variants, even if they are not separately discussed in the present documents.

Identical reference numerals in the individual figures and images of the drawings designate identical or similar components or components having an identical or similar effect. The diagrams in the drawing also clarify those features which are not provided with reference numerals, regardless of whether such features are described below or not. On the other hand, features which are contained in the present description but not visible or shown in the drawing, are also readily understandable for a person skilled in the art.

As already indicated above, a jet mill, preferably an opposed jet mill, comprising integrated classifier, preferably an integrated dynamic air classifier, can be used for the production of very fine particles in the process according to the invention. Particularly preferably, the air classifier contains a classifying wheel and a classifying wheel shaft and a classifier housing, a classifier gap being formed between the classifying wheel and the classifier housing and a shaft lead-through being formed between the classifying wheel shaft and the classifier housing, and is operated in such a way that flushing of classifier gap and/or shaft lead-through with compressed gases of low energy is effected.

Preferably, the flushing gas is used at a pressure of not more than at least approximately 0.4 bar, particularly preferably not more than at least about 0.3 bar and in particular not more than about 0.2 bar above the internal pressure of the mill. The internal pressure of the mill may be at least about in the range from 0.1 to 0.5 bar.

Furthermore, it is preferable if the flushing gas is used at a temperature of about 80 to about 120° C., in particular approximately 100° C., and/or if the flushing gas used is low-energy compressed air, in particular at about 0.3 bar to about 0.4 bar.

The speed of a classifying rotor of the air classifier and the internal amplification ratio V (=Di/DF) can be chosen or set or can be regulatable so that the circumferential speed of the operating medium (B) at a dip tube or outlet nozzle coordinated with the classifying wheel reaches up to 0.8 times the sound velocity of the operating medium. In the formula V(=Di/DF), Di represents the inner diameter of the classifying wheel (8), i.e. the distance between the inner edges of the paddles (34), and DF represents the inner diameter of the immersed pipe (20). An example for a particularly preferred combination comprises an inner diameter of the classifying wheel (8) Di=280 mm and an inner diameter of the immersed pipe (20) DF=100 mm.

This can be further developed if the speed of a classifying rotor of the air classifier and the internal amplification ratio V (=Di/DF) are chosen or set or are regulatable so that the circumferential speed of the operating medium (B) at the dip tube or outlet nozzle reaches up to 0.7 times and particularly preferably up to 0.6 times the sound velocity of the operating medium.

In particular, it is furthermore possible advantageously to ensure that the classifying rotor has a height clearance which increases with decreasing radius, that area of the classifying rotor through which flow takes place preferably being at least approximately constant. Alternatively or in addition, it may be advantageous if the classifying rotor has an interchangeable, corotating dip tube. In an even further variant, it is preferable to provide a fines outlet chamber which has a widening cross section in the direction of flow.

Furthermore, the jet mill according to the invention can advantageously contain in particular an air classifier which contains the individual features or combinations of features of the wind classifier according to EP 0 472 930 B1. The entire disclosure content of EP 0 472 930 B1 is hereby fully incorporated by reference. In particular, the air classifier may contain means for reducing the circumferential components of flow according to EP 0 472 930 B1. It is possible in particular to ensure that an outlet nozzle which is coordinated with the classifying wheel of the air classifier and is in the form of a dip tube has, in the direction of flow, a widening cross section which is preferably designed to be rounded for avoiding eddy formations.

Preferred and/or advantageous embodiments of the milling system which can be used in the process according to the invention or of the mill are evident from FIGS. 1 to 3*a* and the associated description, it once again being emphasized that these embodiments merely explain the invention in more detail by way of example, i.e. said invention is not limited to these working examples and use examples or to the respective combinations of features within individual working examples.

Figure 1:
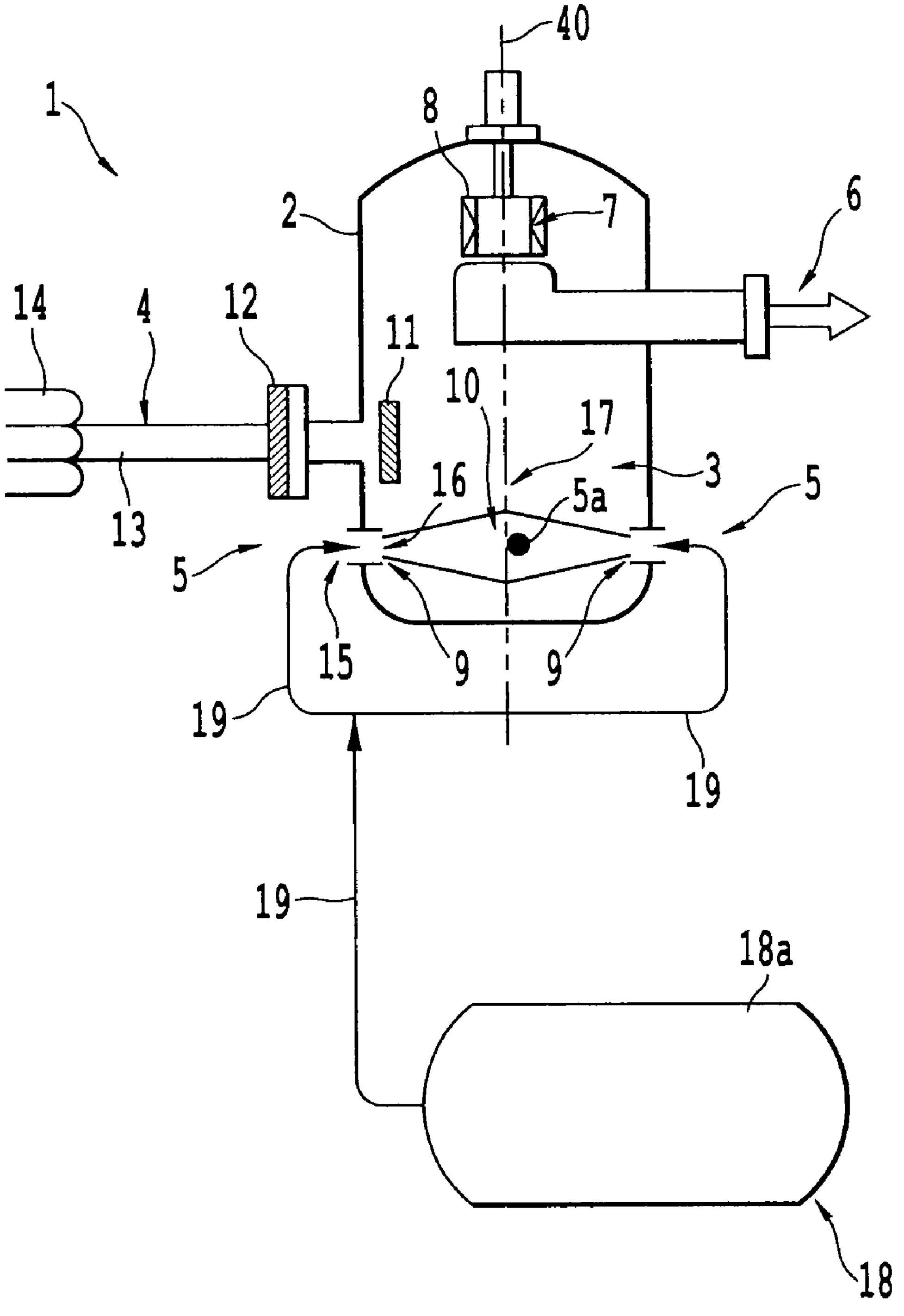
FIG. 1 shows, in the form of a diagram, a working example of a jet mill in a partly cutaway schematic drawing.

FIG. 1 shows a working example of a jet mill 1 comprising a cylindrical housing 2, which encloses a milling chamber 3, a feed 4 for material to be milled, approximately at half the height of the milling chamber 3, at least one milling jet inlet 5 in the lower region of the milling chamber 3 and a product outlet 6 in the upper region of the milling chamber 3. Arranged there is an air classifier 7 having a rotatable classifying wheel 8 with which the milled material (not shown) is classified in order to remove only milled material below a certain particle size through the product outlet 6 from the milling chamber 3 and to feed milled material having a particle size above the chosen value to a further milling process.

The classifying wheel 8 may be a classifying wheel which is customary in air classifiers and the blades of which (cf. below, for example in relation to FIG. 3) bound radial blade channels, at the outer ends of which the classifying air enters and particles of relatively small particle size or mass are entrained to the central outlet and to the product outlet 6 while larger particles or particles of greater mass are rejected under the influence of centrifugal force. Particularly preferably, the air classifier 7 and/or at least the classifying wheel 8 thereof are equipped with at least one design feature according to EP 0 472 930 B1.

It is possible to provide only one milling jet inlet 5, for example consisting of a single, radially directed inlet opening or inlet nozzle 9, in order to enable a single milling jet 10 to meet, at high energy, the particles of material to be milled which reach the region of the milling jet 10 from the feed 4 for material to be milled, and to divide the particles of material to be milled into smaller particles which are taken in by the classifying wheel 8 and, if they have reached an appropriately small size or mass, are transported to the outside through the product outlet 6. However, a better effect is achieved with milling jet inlets 5 which are diametrically opposite one another in pairs and form two milling jets 10 which strike one another and result in more intense particle division than is possible with only one milling jet 10, in particular if a plurality of milling jet pairs are produced.

Preferably two or more milling jet inlets, preferably milling nozzles, in particular 3, 4, 5, 6, 7, 8, 9, 10, 11 or 12 milling jet inlets, which are arranged in the lower third of the preferably cylindrical housing of the milling chamber, are used. These milling jet inlets are ideally arranged distributed in a plane and uniformly over the circumference of the milling container so that the milling jets all meet at one point in the interior of the milling container. Particularly preferably, the inlets or nozzles are distributed uniformly over the circumference of the milling container. In the case of three milling jets, this would be an angle of 120° between the respective inlets or nozzles. In general, it may be said that the larger the milling chamber, the more inlets or milling nozzles are used.

In a preferred embodiment of the process according to the invention, the milling chamber can, in addition to the milling jet inlets, contain heating openings 5*a*, preferably in the form of heating nozzles, through which hot gas can be passed into the mill in the heat-up phase. These nozzles or openings can—as already described above—be arranged in the same plane as the milling openings or nozzles 5. One heating opening or nozzle 5*a*, but preferably also a plurality of heating openings or nozzles 5*a*, particularly preferably 2, 3, 4, 5, 6, 7 or 8 heating openings or nozzles 5*a*, may be present.

In a very particularly preferred embodiment, the mill contains two heating nozzles or openings and three milling nozzles or openings.

For example, the processing temperature can furthermore be influenced by using an internal heating source 11 between feed 4 for material to be milled and the region of the milling jets 10 or a corresponding heating source 12 in the region outside the feed 4 for material to be milled, or by processing particles of material to be milled which is in any case already warm and avoids heat losses in reaching the feed 4 for material to be milled, for which purpose a feed tube 13 is surrounded by a temperature-insulating jacket 14. The heating source 11 or 12, if it is used, can in principle be of any desired form and therefore usable for the particular purpose and chosen according to availability on the market so that further explanations in this context are not required.

In particular, the temperature of the milling jet or of the milling jets 10 is relevant to the temperature, and the temperature of the material to be milled should at least approximately correspond to this milling jet temperature.

For the formation of the milling jets 10 introduced through milling jet inlets 5 into the milling chamber 3, superheated steam is used in the present working example. It is to be assumed that the heat content of the steam after the inlet nozzle 9 of the respective milling jet inlet 5 is not substantially lower than before this inlet nozzle 9. Because the energy necessary for impact comminution is to be available primarily as flow energy, the pressure drop between the inlet 15 of the inlet nozzle 9 and the outlet 16 thereof will be considerable in comparison (the pressure energy will be very substantially converted into flow energy) and the temperature drop too will not be inconsiderable. This temperature drop in particular should be compensated by the heating of the material to be milled, to such an extent that material to be milled and milling jet 10 have the same temperature in the region of the centre 17 of the milling chamber 3 when at least two milling jets 10 meet one another or in the case of a multiplicity of two milling jets 10.

Regarding the design of and procedure for preparing the milling jet 10 comprising superheated steam, in particular in the form of a closed system, reference is made to DE 198 24 062 A1, the complete disclosure content of which in this regard is hereby incorporated by reference. For example, milling of hot slag as material to be milled is possible with optimum efficiency by a closed system.

In the diagram of the present working example of the jet mill 1, any feed of an operating medium B is typified by a reservoir or generation device 18, which represents, for example, a tank 18*a*, from which the operating medium B is passed via pipe devices 19 to the milling jet inlet 5 or the milling jet inlets 5 to form the milling jet 10 or the milling jets 10.

In particular, starting from a jet mill 1 equipped with an air classifier 7, the relevant working examples being intended and understood herein only as exemplary and not as limiting, a process for producing very fine particles is carried out with this jet mill 1 using an integrated dynamic air classifier 7. Apart from the fact that the milling phase is preceded by a heat-up phase in which all parts which come into contact with the vapour are heated to a temperature above the dew point of the vapour and the fact that a preferably integrated classifier is used, the innovation compared with conventional jet mills is that the speed of the classifying rotor or classifying wheel 8 of the air classifier 7 and the internal amplification ratio V (=Di/DF) are preferably chosen, set or regulated so that the circumferential speed of an operating medium B at a dip tube or outlet nozzle 20 coordinated with the classifying wheel 8 reaches up to 0.8 times, preferably up to 0.7 times and particularly preferably up to 0.6 times the sound velocity of the operating medium B.

With reference to the previously explained variant with superheated steam as operating medium B or as an alternative thereto, it is particularly advantageous to use, as operating medium, gases or vapours B which have a higher and in particular substantially higher sound velocity than air (343 m/s). Specifically, gases or vapours B which have a sound velocity of at least 450 m/s are used as operating medium. This substantially improves the production and the yield of very fine particles compared with processes using other operating media, as are conventionally used according to practical knowledge, and hence optimizes the process overall.

A fluid, preferably the abovementioned steam, but also hydrogen gas or helium gas, is used as operating medium B.

In a preferred embodiment, the jet mill 1, which is in particular a fluidized-bed jet mill or a dense-bed jet mill or a spiral jet mill, is formed or designed with the integrated dynamic air classifier 7 for producing very fine particles or provided with suitable devices so that the speed of the classifying rotor or classifying wheel 8 of the air classifier 7 and the internal amplification ratio V (=Di/DF) are chosen or set or regulatable or controllable so that the circumferential speed of the operating medium B at the dip tube or outlet nozzle 20 reaches up to 0.8 times, preferably up to 0.7 times and particularly preferably up to 0.6 times the sound velocity of the operating medium B.

Furthermore, the jet mill 1 is preferably equipped with a source, for example the reservoir or generation device 18 for steam or superheated steam or another suitable reservoir or generation device, for an operating medium B, or such an operating medium source is coordinated with it, from which, for operation, an operating medium B is fed at a higher and in particular substantially higher sound velocity than air (343 m/s), such as, preferably, a sound velocity of at least 450 m/s. This operating medium source, such as, for example, the reservoir or generation device 18 for steam or superheated steam, contains gases or vapours B for use during operation of the jet mill 1, in particular the abovementioned steam but hydrogen gas and helium gas are also preferred alternatives.

Particularly with the use of hot steam as operating medium B, it is advantageous to provide pipe devices 19 which are equipped with expansion bends (not shown), and are then also to be designated as vapour feed pipe, to the inlet or milling nozzles 9, i.e. preferably when the vapour feed pipe is connected to a steam source as a reservoir or generation device 18.

A further advantageous aspect in the use of steam as operating medium B consists in providing the jet mill 1 with a surface which is as small as possible, or in other words in optimizing the jet mill 1 with regard to as small a surface as possible. Particularly in relation to steam as operating medium B, it is particularly advantageous to avoid heat exchange or heat loss and hence energy loss in the system. This purpose is also served by the further alternative or additional design measures, namely designing the components of the jet mill 1 for avoiding accumulations or optimizing said components in this respect. This can be realized, for example, by using flanges which are as thin as possible in the pipe devices 19 and for connection of the pipe devices 19.

Energy loss and also other flow-relevant adverse effects can furthermore be suppressed or avoided if the components of the jet mill 1 are designed or optimized for avoiding condensation. Even special devices (not shown) for avoiding condensation may be present for this purpose. Furthermore, it is advantageous if the flow paths are at least substantially free of projections or optimized in this respect. In other words, the principle of avoiding as much as possible or everything which can become cold and where condensation may therefore arise is implemented by these design variants individually or in any desired combinations.

Furthermore, it is advantageous and therefore preferable if the classifying rotor has a height clearance increasing with decreasing radius, i.e. towards its axis, in particular that area of the classifying rotor through which flow takes place being at least approximately constant. Firstly or alternatively, it is possible to provide a fines outlet chamber which has a widening cross section in the direction of flow.

A particularly preferred embodiment in the case of the jet mill 1 consists in the classifying rotor 8 having an interchangeable, corotating dip tube 20.

Further details and variants of preferred designs of the jet mill 1 and its components are explained below with reference to FIGS. 2 and 3.

The jet mill 1 preferably contains, as shown in the schematic diagram in FIG. 2, an integrated air classifier 7 which is, for example in the case of designs of the jet mill 1 as a fluidized-bed jet mill or as a dense-bed jet mill or as a spiral jet mill, a dynamic air classifier 7 which is advantageously arranged in the centre of the milling chamber 3 of the jet mill 1. Depending on the volume flow rate of milling gas and classifier speed, the desired fineness of the material to be milled can be influenced.

In the air classifier 7 of the jet mill 1 according to FIG. 2, the entire vertical air classifier 7 is enclosed by a classifier housing 21 which substantially comprises the upper part 22 of the housing and the lower part 23 of the housing. The upper part 22 of the housing and the lower part 23 of the housing are provided at the upper and lower edge, respectively, with in each case an outward-directed circumferential flange 24 and 25, respectively. The two circumferential flanges 24, 25 are present one on top of the other in the installation or operational state of the air classifier 8 and are fixed by suitable means to one another. Suitable means for fixing are, for example, screw connections (not shown). Clamps (not shown) or the like can also serve as detachable fixing means.

At virtually any desired point of the flange circumference, two circumferential flanges 24 and 25 are connected to one another by a joint 26 so that, after the flange connecting means have been released, the upper part 22 of the housing can be swiveled upwards relative to the lower part 23 of the housing in the direction of the arrow 27 and the upper part 22 of the housing is accessible from below and the lower part 23 of the housing from above. The lower part 23 of the housing in turn is formed in two parts and substantially comprises the cylindrical classifying chamber housing 28 with the circumferential flange 25 at its upper open end and a discharge cone 29 which tapers conically downwards. The discharge cone 29 and the classifying chamber housing 28 rest one on top of the other with flanges 30, 31 at the upper and lower end, respectively, and the two flanges 30, 31 of discharge cone 29 and classifying chamber housing 28 are connected to one another by detachable fixing means (not shown) like the circumferential flanges 24, 25. The classifier housing 21 assembled in this manner is suspended in or from support arms 28*a*, a plurality of which are distributed as far as possible uniformly spaced around the circumference of the classifier or compressor housing 21 of the air classifier 7 of the jet mill 1 and grip the cylindrical classifying chamber housing 28.

A substantial part of the housing internals of the air classifier 7 is in turn the classifying wheel 8 having an upper cover disc 32, having a lower cover disc 33 axially a distance away and on the outflow side and having blades 34 of expedient contour which are arranged between the outer edges of the two cover discs 32 and 33, firmly connected to these and distributed uniformly around the circumference of the classifying wheel 8. In the case of this air classifier 7, the classifying wheel 8 is driven via the upper cover disc 32 while the lower cover disc 33 is the cover disc on the outflow side. The mounting of the classifying wheel 8 comprises a classifying wheel shaft 35 which is positively driven in an expedient manner, is led out of the classifier housing 21 at the upper end and, with its lower end inside the classifier housing 21, supports the classifying wheel 8 non-rotatably in an overhung bearing. The classifying wheel shaft 35 is led out of the classifier housing 21 in a pair of worked plates 36, 37 which close the classifier housing 21 at the upper end of a housing end section 38 in the form of a truncated cone at the top, guide the classifying wheel shaft 35 and seal this shaft passage without hindering the rotational movements of the classifying wheel shaft 35. Expediently, the upper plate 36 can be coordinated in the form of a flange non-rotatably with the classifying wheel shaft 35 and supported nonrotatably via rotary bearing 35*a* on the lower plate 37, which in turn is coordinated with a housing end section 38. The underside of the cover disc 33 on the outflow side is in the common plane between the circumferential flanges 24 and 25 so that the classifying wheel 8 is arranged in its totality within the hinged upper part 22 of the housing. In the region of the conical housing end section 38, the upper part 22 of the housing also has a tubular product feed nozzle 39 of the feed 4 for material to be milled, the longitudinal axis of which product feed nozzle is parallel to the axis 40 of rotation of the classifying wheel 8 and its drive or classifying wheel shaft 35 and which product feed nozzle is arranged radially outside on the upper part 22 of the housing, as far as possible from this axis 40 of rotation of the classifying wheel 8 and its drive or classifying wheel shaft 35.

In a particularly preferred embodiment according to FIGS. 2*a* and 3*a*, the integrated dynamic air classifier 1 contains a classifying wheel 8 and a classifying wheel shaft 35 and a classifier housing, as was already explained. A classifier gap 8*a* is defined between the classifying wheel 8 and the classifier housing 21, and a shaft lead-through 35*b* is formed between the classifying wheel shaft and the classifier housing 21 (cf. in this context FIGS. 2*a* and 3*a*). In particular, starting from a jet mill 1 equipped with such an air classifier 7, the relevant working examples being understood here as being only exemplary and not limiting, a process for producing very fine particles is carried out using this jet mill 1, comprising an integrated dynamic air classifier 7. In addition to the fact that the milling chamber is heated before the milling phase to a temperature above the dew point of the vapour, the innovation compared with conventional jet mills consists in flushing of classifier gap 8*a* and/or shaft lead-through 35*b* with compressed gases of low energy. The peculiarity of this design is precisely the combination of the use of these compressed low-energy gases with the high-energy superheated steam, with which the mill is fed through the milling jet inlets, in particular milling nozzles or milling nozzles present therein. Thus, high-energy media and low-energy media are simultaneously used.

In the embodiment according to both FIGS. 2 and 3 on the one hand and 2*a* and 3*a* on the other hand, the classifier housing 21 receives the tubular outlet nozzle 20 which is arranged axially identically with the classifying wheel 8 and rests with its upper end just below the cover disc 33 of the classifying wheel 8, which cover disc is on the outflow side, but without being connected thereto. Mounted axially in coincidence at the lower end of the outlet nozzle 20 in the form of a tube is an outlet chamber 41 which is likewise tubular but the diameter of which is substantially larger than the diameter of the outlet nozzle 20 and in the present working example is at least twice as large as the diameter of the outlet nozzle 20. A substantial jump in diameter is therefore present at the transition between the outlet nozzle 20 and the outlet chamber 41. The outlet nozzle 20 is inserted into an upper cover plate 42 of the outlet chamber 41. At the bottom, the outlet chamber 41 is closed by a removable cover 43. The assembly comprising outlet nozzle 20 and outlet chamber 41 is held in a plurality of support arms 44 which are distributed uniformly in a star-like manner around the circumference of the assembly, connected firmly at their inner ends in the region of the outlet nozzle 20 to the assembly and fixed with their outer ends to the classifier housing 21.

The outlet nozzle 20 is surrounded by a conical annular housing 45, the lower, larger external diameter of which corresponds at least approximately to the diameter of the outlet chamber 41 and the upper, smaller external diameter of which corresponds at least approximately to the diameter of the classifying wheel 8. The support arms 44 end at the conical wall of the annular housing 45 and are connected firmly to this wall, which in turn is part of the assembly comprising outlet nozzle 20 and outlet chamber 41.

The support arms 44 and the annular housing 45 are parts of the flushing air device (not shown), the flushing air preventing the penetration of material from the interior of the classifier housing 21 into the gap between the classifying wheel 8 or more exactly the lower cover disc 3 thereof and the outlet nozzle 20. In order to enable this flushing air to reach the annular housing 45 and from there the gap to be kept free, the support arms 44 are in the form of tubes, with their outer end sections led through the wall of the classifier housing 21 and connected via an intake filter 46 to a flushing air source (not shown). The annular housing 45 is closed at the top by a perforated plate 47 and the gap itself can be adjustable by an axially adjustable annular disc in the region between perforated plate 47 and lower cover disc 33 of the classifying wheel 8.

The outlet from the outlet chamber 41 is formed by a fines discharge tube 48 which is led from the outside into the classifier housing 21 and is connected tangentially to the outlet chamber 41. The fines discharge tube 48 is part of the product outlet 6. A deflection cone 49 serves for cladding the entrance of the fines discharge tube 48 at the outlet chamber 41.

At the lower end of the conical housing end section 38, a classifying air entry spiral 50 and a coarse material discharge 51 are coordinated in horizontal arrangement with the housing end section 38. The direction of rotation of the classifying air entry spiral 50 is in the opposite direction to the direction of rotation of the classifying wheel 8. The coarse material discharge 51 is detachably coordinated with the housing end section 38, a flange 52 being coordinated with the lower end of the housing end section 38 and a flange 53 with the upper end of the coarse material discharge 51, and both flanges 52 and 53 in turn being detachably connected to one another by known means when the air classifier 7 is ready for operation.

The dispersion zone to be designed is designated by 54. Flanges worked (beveled) on the inner edge, for clean flow, and a simple lining are designated by 55.

Finally, an interchangeable protective tube 56 is also mounted as a closure part on the inner wall of the outlet nozzle 20, and a corresponding interchangeable protective tube 57 can be mounted on the inner wall of the outlet chamber 41.

At the beginning of operation of the air classifier 7 in the operating state shown, classifying air is introduced via the classifying air entry spiral 50 into the air classifier 7 under a pressure gradient and with an entry velocity chosen according to the purpose. As a result of introducing the classifying air by means of a spiral, in particular in combination with the conicity of the housing end section 38, the classifying air rises spirally upwards in the region of the classifying wheel 8. At the same time, the "product" comprising solid particles of different mass is introduced via the product feed nozzle 39 into the classifier housing 21. Of this product, the coarse material, i.e. the particle fraction having a greater mass, moves in a direction opposite to the classifying air into the region of the coarse material discharge 51 and is provided for further processing. The fines, i.e. the particle fraction having a lower mass, is mixed with the classifying air, passes radially from the outside inwards through the classifying wheel 8 into the outlet nozzle 20, into the outlet chamber 41 and finally via a fines outlet tube 48 into a fines outlet 58, and from there into a filter in which the operating medium in the form of a fluid, such as, for example air, and fines are separated from one another. Coarser constituents of the fines are removed radially from the classifying wheel 8 by centrifugal force and mixed with the coarse material in order to leave the classifier housing 21 with the coarse material or to circulate in the classifier housing 21 until it has become fines having a particle size such that it is discharged with the classifying air.

Owing to the abrupt widening of the cross section from the outlet nozzle 20 to the outlet chamber 41, a substantial reduction in the flow velocity of the fines/air mixture takes place there. This mixture will therefore pass at a very low flow velocity through the outlet chamber 41 via the fines outlet tube 48 into the fines outlet 58 and produce only a small amount of abraded material on the wall of the outlet chamber 41. For this reason, the protective tube 57 is also only a very precautionary measure. The high flow velocity in the classifying wheel 8 for reasons relating to a good separation technique, also prevails, however, in the discharge or outlet nozzle 20, and the protective tube 56 is therefore more important than the protective tube 57. Particularly important is the jump in diameter with a diameter increase at the transition from the outlet nozzle 20 into the outlet chamber 41.

The air classifier 7 can besides in turn be readily maintained as a result of the subdivision of the classifier housing 21 in the manner described and the coordination of the classifier components with the individual part-housings, and components which have become damaged can be changed with relatively little effort and within short maintenance times.

While the classifying wheel 8 with the two cover discs 32 and 33 and the blade ring 59 arranged between them and having the blades 34 is shown in the schematic diagram of FIGS. 2 and 2*a* in the already known, customary form with parallel cover discs 32 and 33 having parallel surfaces, the classifying wheel 8 is shown in FIGS. 3 and 3*a* for a further working example of the air classifier 7 of an advantageous further development.

This classifying wheel 8 according to FIGS. 3 and 3*a* contains, in addition to the blade ring 59 with the blades 34, the upper cover disc 32 and the lower cover disc 33 an axial distance away therefrom and located on the outflow side, and is rotatable about the axis 40 of rotation and thus the longitudinal axis of the air classifier 7. The diametral dimension of the classifying wheel 8 is perpendicular to the axis 40 of rotation, i.e. to the longitudinal axis of the air classifier 7, regardless of whether the axis 40 of rotation and hence said longitudinal axis are perpendicular or horizontal. The lower cover disc 33 on the outflow side concentrically encloses the outlet nozzle 20. The blades 34 are connected to the two cover discs 33 and 32. The two cover discs 32 and 33 are now, in contrast to the related art, conical, preferably such that the distance of the upper cover disc 32 from the cover disc 33 on the outflow side increases from the ring 59 of blades 34 inwards, i.e. towards the axis 40 of rotation, and does so preferably continuously, such as, for example, linearly or non-linearly, and more preferably so that the area of the cylinder jacket through which flow takes place remains approximately constant for every radius between blade outlet edges and outlet nozzle 20. The outflow velocity which decreases owing to the decreasing radius in known solutions remains at least approximately constant in this solution.

In addition to that variant of the design of the upper cover disc 32 and of the lower cover disc 33 which is explained above and in FIGS. 3 and 3*a*, it is also possible for only one of these two cover discs 32 or 33 to be conical in the manner explained and for the other cover disc 33 or 32 to be flat, as is the case for both cover discs 32 and 33 in relation to the working example according to FIG. 2. In particular, the shape of the cover disc which does not have parallel surfaces can be such that the area of the cylinder jacket through which flow takes place remains at least approximately constant for every radius between blade outlet edges and outlet nozzle 20.

The invention, in particular the process according to the invention, is described merely by way of example in the description and in the drawing by way of the working examples and not limited thereto but comprises all variations, modifications, substitutions and combinations which the person skilled in the art can derive from the present documents, in particular from the claims and the general presentations in the introduction of this description and the description of the working examples and the diagrams thereof in the drawing and can combine with his professional knowledge and the related art. In particular, all individual features and design possibilities of the invention and their variants can be combined.

With the process described in more detail above, it is possible to mill any desired particles, in particular amorphous particles, so that pulverulent solids having a medium particle size $d_{50}$ of <1.5 μm and/or a $d_{90}$ value of <2 μm and/or a $d_{99}$ value of <2 μm are obtained. In particular, it is possible to achieve these particle sizes or particle size distributions by dry milling.

The amorphous solids according to the invention are distinguished in that they have a median particle size (TEM) $d_{50}$ of <1.5 μm, preferably $d_{50}$<1 μm, particularly preferably $d_{50}$ of 0.01 to 1 μm, very particularly preferably $d_{50}$ of 0.05 to 0.9 μm, particularly preferably $d_{50}$ of 0.05 to 0.8 μm, especially preferably of 0.05 to 0.5 μm and very especially preferably of 0.08 to 0.25 μm and/or a $d_{90}$ value of <2 μm, preferably $d_{90}$ of <1.8 μm, particularly preferably $d_{90}$ of 0.1 to 1.5 μm, very particularly preferably $d_{90}$ of 0.1 to 1.0 μm and particularly preferably $d_{90}$ of 0.1 to 0.5 μm and/or a $d_{99}$ value of <2 μm, preferably $d_{99}$<1.8 μm, particularly preferably $d_{99}$<1.5 μm, very particularly preferably $d_{99}$ of 0.1 to 1.0 μm and particularly preferably $d_{99}$ of 0.25 to 1.0 μm. All abovementioned particle sizes are based on the particle size determination by means of TEM analysis and image evaluation.

The amorphous solids according to the invention may be gels but also other types of amorphous solids. They are preferably solids containing or consisting of at least one metal and/or metal oxide, in particular amorphous oxides of metals of the 3rd and 4th main group of the Periodic Table of the Elements. This applies both to the gels and to the amorphous solids having a different type of structure. Precipitated silicas, pyrogenic silicas, silicates and silica gels are particularly preferred, silica gels including hydrogels as well as aerogels as well as xerogels.

In a first embodiment, the amorphous solids according to the invention are particulate solids containing aggregates and/or agglomerates, in particular precipitated silicas and/or pyrogenic silica and/or silicates and/or mixtures thereof, having a median particle size $d_{50}$ of <1.5 μm, preferably $d_{50}$ of <1 μm, particularly preferably $d_{50}$ of 0.01 to 1 μm, very particularly preferably $d_{50}$ of 0.05 to 0.9 μm, particularly preferably $d_{50}$ of 0.05 to 0.8 μm, especially preferably of 0.05 to 0.5 μm and very especially preferably of 0.1 to 0.25 μm and/or a $d_{90}$ value of <2 μm, preferably $d_{90}$ of <1.8 μm, particularly preferably $d_{90}$ of 0.1 to 1.5 μm, very particularly preferably $d_{90}$ of 0.1 to 1.0 μm, particularly preferably $d_{90}$ of 0.1 to 0.5 μm and especially preferably $d_{90}$ of 0.2 to 0.4 μm and/or a $d_{99}$ value of <2 μm, preferably $d_{99}$ of <1.8 μm, particularly preferably $d_{99}$ of <1.5 μm, very particularly preferably $d_{99}$ of 0.1 to 1.0 μm, particularly preferably $d_{99}$ of 0.25 to 1.0 μm and especially preferably $d_{99}$ of 0.25 to 0.8 μm. Very particularly preferred here are precipitated silicas since they are substantially more economical in comparison with pyrogenic silicas. All abovementioned particle sizes are based on the particle size determination by means of TEM analysis and image evaluation.

In a second embodiment, the amorphous solids according to the invention are gels, preferably silica gels, in particular xerogels or aerogels, having a median particle size $d_{50}$ of <1.5 μm, preferably $d_{50}$ of <1 μm, particularly preferably $d_{50}$ of 0.01 to 1 μm, very particularly preferably $d_{50}$ of 0.05 to 0.9 μm, particularly preferably $d_{50}$ of 0.05 to 0.8 μm, especially preferably of 0.05 to 0.5 μm and very especially preferably of 0.1 to 0.25 μm and/or a $d_{90}$ value of <2 μm, preferably a $d_{90}$ of 0.05 to 1.8 μm, particularly preferably $d_{90}$ of 0.1 to 1.5 μm, very particularly preferably $d_{90}$ of 0.1 to 1.0 μm, particularly preferably $d_{90}$ of 0.1 to 0.5 μm and especially preferably $d_{90}$ of 0.2 to 0.4 μm and/or a $d_{99}$ value of <2 μm, preferably $d_{99}$ of <1.8 μm, particularly preferably $d_{99}$ of 0.05 to 1.5 μm, very particularly preferably $d_{99}$ of 0.1 to 1.0 μm, particularly preferably $d_{99}$ of 0.25 to 1.0 μm and especially preferably $d_{99}$ of 0.25 to 0.8 μm. All abovementioned particle sizes are based on the particle size determination by means of TEM analysis and image evaluation.

A further, even more preferred embodiment 2a relates to a narrow-pore xerogel which, in addition to the $d_{50}$, $d_{90}$ and $d_{99}$ values already contained in embodiment 2, also has a pore volume of 0.2 to 0.7 ml/g, preferably 0.3 to 0.4 ml/g.

A further, even more preferred embodiment 2b relates to a xerogel which, in addition to the $d_{50}$, $d_{90}$ and $d_{99}$ values already contained in embodiment 2, has a pore volume of 0.8 to 1.4 ml/g, preferably 0.9 to 1.2 ml/g.

A further, even more preferred embodiment 2c relates to a xerogel which, in addition to the $d_{50}$, $d_{90}$ and $d_{99}$ values already contained in embodiment 2, also has a pore volume of 1.5 to 2.1 ml/g, preferably 1.7 to 1.9 ml/g.

Having generally described this invention, a further understanding can be obtained by reference to certain specific examples which are provided herein for purposes of illustration only, and are not intended to be limiting unless otherwise specified.

EXAMPLES

The reaction conditions and the physicochemical data of the precipitated silicas according to the invention were determined by the following methods:

Particle Size Determination

In the following examples, particle sizes which were measured by one of the three following methods are mentioned at various points. The reason for this is that the particle sizes mentioned there extend over a very wide particle size range (~100 nm to 1000 μm). Depending on the expected particle size of the sample to be investigated, a different method from among the three particle size measurement methods may therefore be suitable in each case.

Particles having an expected median particle size of about >50 μm were determined by means of screening. Particles having an expected median particle size of about 1-50 μm were investigated by means of the laser diffraction method, and TEM analysis+image evaluation were used for particles having an expected median particle size of <1.5 μm.

The method used for determining the particle sizes mentioned in the examples is stated in each case in the tables by means of a footnote. The particle sizes which are mentioned in the claims relate exclusively to the determination of the particle size by means of transmission electron microscopy (TEM) in combination with image analysis.

1. Determination of the Particle Distribution by Means of Screening

For determining the particle distribution, the sieve fractions were determined by means of a mechanical shaker (Retsch AS 200 Basic).

For the sieve analysis, the test sieves having a defined mesh size were stacked one on top of the other in the following sequence:

Dust tray, 45 μm, 63 μm, 125 μm, 250 μm, 355 μm, 500 μm.

The resulting sieve tower was fastened to the sieving machine. For screening, 100 g of solid were weighed accurately to 0.1 g and added to the uppermost sieve of the sieve tower. Shaking was effected for 5 minutes at an amplitude of 85.

After the screening had been switched off automatically, the individual fractions were reweighed accurately to 0.1 g. The fractions must be weighed directly after shaking since moisture losses may otherwise falsify the results.

The summed weights of the individual fractions should give at least 95 g in order to be able to evaluate the result.

2. Determination of the Particle Size Distribution by Means of Laser Diffraction (Horiba LA 920)

The determination of the particle distribution was effected by the laser diffraction principle on a laser diffractometer (from Horiba, LA-920).

First, the sample of the amorphous solid was dispersed in 100 ml of water without addition of dispersing additives in a 150 ml beaker (diameter: 6 cm) so that a dispersion having a proportion by weight of 1% by weight of $SiO_2$ forms. This dispersion was then thoroughly dispersed (300 W, unpulsed) using an ultrasound finger (Dr Hielscher UP400s, Sonotrode H7) over a period of 5 min. For this purpose, the ultrasound finger should be attached so that the lower end thereof dips to about 1 cm above the bottom of the beaker. Immediately after the dispersing, the particle size distribution of a partial sample of the dispersion subjected to ultrasound was determined using the laser diffractometer (Horiba LA-920). A refractive index of 1.09 should be chosen for the evaluation using the Horiba LA-920 standard software supplied.

All measurements were effected at room temperature. The particle size determination and the relevant sizes, such as, for example, the particle sizes $d_{90}$ and $d_{99}$, were automatically calculated by the device and plotted as a graph. The information and the operating instructions should be noted.

3. Determination of the Particle Size by Means of Transmission Electron Microscopy (TEM) and Image Analysis The preparation of the transmission electron micrographs (TEM) was effected on the basis of ASTM D 3849-02.

For the measurements based on image analysis, a transmission electron microscope (from Hitachi, H-7500, having a maximum acceleration voltage of 120 kV) was used. The digital image processing was effected by means of software from Soft Imaging Systems (SIS, Münster, Westphalia). The program version iTEM 5.0 was used.

For the determinations, about 10-15 mg of the amorphous solid were dispersed in an isopropanol/water mixture (20 ml of isopropanol/10 ml of distilled water) and treated for 15 min with ultrasound (ultrasound processor UP 100, from Dr Hielscher GmbH, HF power 100 W, HF frequency 35 kHz). Thereafter, a small amount of (about 1 ml) was taken from the prepared dispersion and then applied to the support grid. The excess dispersion was absorbed using filter paper. The grid was then dried.

The choice of magnification was described in ITEM WK 5338 (ASTM) and was dependent on the primary particle size of the amorphous solid to be investigated. Usually, the electron-optical magnification 50,000:1 and the final magnification 20,000:1 were chosen in the case of silicas. For the digital recording system, ASTM D 3849 specifies the suitable resolution in nm/pixel, depending on the primary particle size of the amorphous solid to be measured.

The recording conditions must be combined so that the reproducibility of the measurements can be ensured.

The individual particles to be characterized on the basis of the transmission electron micrographs must be imaged with sufficiently crisp contours. The distribution of the particles should not be too dense. The particles should as far as possible be separated from one another. There should be as few overlaps as possible.

After sampling various image sections of a TEM preparation, suitable regions were correspondingly selected. It should be ensured here that the ratio of small, medium and large particles for the respective sample was representative and characteristic and there was no selective preference of small or large particles by the operator.

The total number of aggregates to be measured depends on the scatter of the aggregate sizes: the larger this is, the more particles have to be measured in order to arrive at an adequate statistical conclusion. In the case of silicas, about 2500 individual particles were measured.

The determination of the primary particle sizes and size distributions was effected on the basis of transmission electron micrographs prepared specially for this purpose and analysis was effected by means of a particle size analyser TGZ3 according to Endter and Gebauer (sold by Carl Zeiss). The entire measuring process was supported by the analysis software DASYLab 6.0-32.

First, the measuring ranges were calibrated according to the size range of the particles to be investigated (determination of the smallest and largest particles), after which the measurements were effected. An enlarged transparency of a transition electron micrograph was positioned on the evaluation desk so that the centre of gravity of a particle was approximately in the centre of the measuring mark. Thereafter, by turning the hand wheel on the TGZ3, the diameter of the circular measuring mark was changed until its area was as close as possible to that of the image object to be analysed.

Frequently, the structures to be analysed were not circular. In this case, those area sections of the particle which project beyond the measuring mark have to be matched with those area sections of the measuring mark which lie outside the particle boundary. Once this match had been made, the actual counting process was triggered by pressing a foot switch. The particle in the region of the measuring mark was perforated by a marking pin striking downwards.

Thereafter, the TEM transparency was moved again on the evaluation desk until a new particle was adjusted under the measuring mark. A new matching and counting procedure was effected. This was repeated until all particles required according to the evaluation statistics have been characterized.

The number of particles to be counted depends on the scatter of the particle size: the greater this is, the more particles have to be counted in order to arrive at an adequate statistical conclusion. In the case of silicas, about 2500 individual particles were measured.

After the end of the evaluation, the values of the individual counters were logged.

The median value of the equivalent diameters of all particles evaluated was stated as the median particle size $d_{50}$. For determining the particle sizes $d_{90}$ and $d_{99}$, the equivalent diameters of all evaluated particles were divided into classes of in each case 25 nm (0-25 nm, 25-50 nm, 50-100 nm, . . . 925-950 nm, 950-975 nm, 975-1000 nm) and the frequencies of the respective classes were determined. From the cumulative plot of this frequency distribution, it was possible to determine the particle sizes $d_{90}$ (i.e. 90% of the evaluated particles have a smaller equivalent diameter) and $d_{99}$.

Determination of the Specific Surface Area (BET)

The specific nitrogen surface area (referred to below as BET surface area) of the pulverulent solids was determined on the basis of ISO 5794-1/Annex D using the TRISTAR 3000 device (Micromeritics) by multipoint determination according to DIN ISO 9277.

Determination of the $N_2$ Pore Volume and the Pore Radius Distribution of Mesoporous Solids by Nitrogen Sorption The principle of measurement was based on nitrogen sorption at 77 K (volumetric method) and can be used for mesoporous solids (2 nm to 50 nm pore diameter).

The determination of the pore size distribution was carried out according to DIN 66134 (determination of the pore size distribution and of the specific surface area of mesoporous solids by nitrogen sorption; method according to Barrett, Joyner and Halenda (BJH)).

Drying of the amorphous solids was effected in a drying oven. The sample preparation and measurement were effected using the ASAP 2400 device (from Micromeritics). Nitrogen 5.0 and helium 5.0 were used as measuring gases. Liquid nitrogen serves as a refrigerating bath. Sample weights were determined in [mg] accurately to one place after the decimal point using an analytical balance.

The sample to be investigated was predried at 105° C. for 15-20 h. 0.3 to 1 g thereof was weighed into a sample vessel. The sample vessel was connected to the ASAP 2400 device and thoroughly heated at 200° C. for 60 min in vacuo (final vacuum <10 μm Hg). The sample cools to room temperature in vacuo and was covered with a layer of nitrogen and weighed. The difference from the weight of the nitrogen-filled sample vessel without solid gives the exact sample weight.

The measurement was effected according to the operating instructions of the ASAP 2400.

For evaluating the $N_2$ pore volume (pore diameter <50 nm), the adsorbed volume was determined on the basis of the desorption branch (pore volume for pores having a pore diameter of <50 nm).

The pore radius distribution was calculated on the basis of the measured nitrogen isotherm according to the BJH method (E. P. Barett, L. G. Joyner, P. H. Halenda, J. Amer. Chem. Soc., vol. 73, 373 (1951)) and plotted as a distribution curve.

The average pore size (pore diameter; APD) was calculated according to the Wheeler equation APD [nm]=4000*mesopore volume [$cm^3$/g]/BET surface area [$_m{}^2$/g]

Determination of the Moisture and of the Loss on Drying

The moisture of amorphous solids was determined according to ISO 787-2 after drying for 2 hours in a through-circulation drying oven at 105° C. This loss on drying predominantly consists of water moisture.

Determination of the pH

The determination of the pH of the amorphous solids was effected in the form of 5% strength aqueous suspension at room temperature on the basis of DIN EN ISO 787-9. The sample weights were changed from the specifications of this standard (5.00 g of $SiO_2$ per 100 ml of demineralized water).

Determination of the DBP Absorption

The DBP absorption (DBP number), which was a measure of the absorbtivity of amorphous solids, was determined on the basis of the standard DIN 53601 as follows:

12.50 g of pulverulent, amorphous solid (moisture content 4±2%) were introduced into the kneader chamber (article number 279061) of the Brabender absorptometer "E" (without damping of the outlet filter of the torque transducer). With constant mixing (kneader blades rotating at a speed of 125 rpm), dibutyl phthalate was added dropwise to the mixture at a rate of 4 ml/min at room temperature by means of the "Brabender T 90/50 Dosimat". Mixing in requires only a small force and was monitored by means of the digital display. Towards the end of the determination, the mixture becomes pasty, which was indicated by a sharp increase in the force required. When the display shows 600 digits (torque of 0.6 Nm), both the kneader and the DBP metering were switched off by means of an electrical contact. The synchronous motor for the DBP feed was coupled to a digital counter so that the consumption of DBP in ml can be read.

The DBP absorbed was stated in the unit [g/100 g] without places after the decimal point and was calculated using the following formula:

$$DBP = \frac{V * D * 100}{E} * \frac{\text{g}}{100\ \text{g}} + K$$

where

DBP=DBP absorption in g/100g

V=consumption of DBP in ml

D=density of DBP in g/ml (1.047 g/ml at 20° C.)

E=sample weight of silica in g

K=correction value according to moisture correction table, in g/100 g

The DBP absorption was defined for anhydrous, amorphous solids. With the use of moist precipitated silicas or silica gels, the correction value K should be taken into account for calculating the DBP absorption. This value can be determined on the basis of the correction table below: for example, a silica water content of 5.8% would mean an addition of 33 g/(100 g) for the DBP absorption. The moisture of the silica or of the silica gel was determined according to the method "Determination of the moisture or of the loss on drying" described below.

Moisture correction table for dibutyl phthalate absorption - anhydrous

| | .% moisture | | | | |
|---|---|---|---|---|---|
| % moisture | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Tamped Density

The determination of the tamped density was effected on the basis of DIN EN ISO 787-11.

A defined amount of a previously unscreened sample was introduced into a graduated glass cylinder and subjected to a specified number of tamps by means of a tamping volumeter. During the tamping, the sample becomes more compact. As a result of the investigation carried out, the tamped density was obtained.

The measurements were carried out on a tamping volumeter having a counter from Engelsmann, Ludwigshafen, type STAV 2003.

First, a 250 ml glass cylinder was tared on a precision balance. 200 ml of the amorphous solid were then introduced into the tared measuring cylinder with the aid of a powder funnel so that no cavities form. The sample amount was then weighed accurately to 0.01 g. The cylinder was then tapped lightly so that the surface of the silica in the cylinder was horizontal. The measuring cylinder was placed in the measuring cylinder holder of the tamping volumeter and tamped 1250 times. The volume of the tamped sample was read accurately to 1 ml after a single tamping cycle.

The tamped density D(t) was calculated as follows:

$$D(t)=m*1000/V$$

D(t): tamped density [g/l]
V: volume of the silica after tamping [ml]
m: mass of the silica [g]

Determination of the Alkali Number

The alkali number determination (AN) was understood as meaning the consumption of hydrochloric acid in ml (in the case of a 50 ml sample volume, 50 ml of distilled water and a hydrochloric acid used which had a concentration of 0.5 mol/l) in a direct potentiometric titration of alkaline solutions or suspensions to a pH of 8.30. The free alkali content of the solution or suspension was determined thereby.

The pH apparatus (from Knick, type: 766 pH meter Calimatic with temperature sensor) and the pH electrode (combined electrode from Schott, type N7680) were calibrated at room temperature with the aid of two buffer solutions (pH=7.00 and pH=10.00). The combined electrode was immersed in the measuring solution or suspension thermostatted at 40° C. and consisting of 50.0 ml of sample and 50.0 ml of demineralized water. Hydrochloric acid solution having a concentration of 0.5 mol/l was then added dropwise until a constant pH of 8.30 was established. Because the equilibrium between the silica and the free alkali content was established only slowly, a waiting time of 15 min was required before a final reading of the acid consumption. In the case of the chosen amounts of substance and concentrations, the read hydrochloric acid consumption in ml corresponds directly to the alkali number, which was stated without dimensions.

As already mentioned, the examples below serve for illustration and more detailed explanation of the invention, but do not limit it in any way.

Starting Materials:

Silica 1:

The precipitated silica used as starting material to be milled was prepared according to the following process:

The waterglass used at various points in the following method for the preparation of silica 1 and the sulphuric acid were characterized as follows:

| | |
|---|---|
| Water glass: | density 1.348 kg/l, 27.0% by weight of $SiO_2$, 8.05% by weight of $Na_2O$ |
| Sulphuric acid: | density 1.83 kg/l, 94% by weight |

117 $m^3$ of water were initially introduced into a 150 $m^3$ precipitation container having an inclined bottom, inclined-blade MIG stirring system and Ekato fluid sheer turbine and 2.7 $m^3$ of water glass were added. The ratio of water glass to water was adjusted so that an alkali number of 7 results. The initially taken mixture was then heated to 90° C. After the temperature had been reached, water glass, at a metering rate of 10.2 $m^3$/h, and sulphuric acid, at a metering rate of 1.55 $m^3$/h, were metered in simultaneously for the duration of 75 min with stirring. Thereafter, water glass, at a metering rate of 18.8 $m^3$/h, and sulphuric acid, at a metering rate of 1.55 $m^3$/h, were added simultaneously for a further 75 min at 90° C. with stirring. During the entire addition time, the metering rate of the sulphuric acid was corrected if required so that an alkali number of 7 was maintained during this period.

The water glass metering was then switched off. Sulphuric acid was then added in the course of 15 min so that a pH of 8.5 was then established. At this pH, the suspension was stirred for the duration of 30 min (=aged). The pH of the suspension was then adjusted to 3.8 by addition of sulphuric acid in the course of about 12 min. During the precipitation, the aging and the acidification, the temperature of the precipitation suspension was kept at 90° C.

The suspension obtained was filtered using a membrane filter press and the filter cake was washed with demineralized water until a conductivity of <10 mS/cm was found in the wash water. The filter cake was then present with a solids content of <25%.

The drying of the filter cake was effected in a spin-flash dryer.

The data of silica 1 were stated in Table 1.

Hydrogel Preparation

A silica gel (=hydrogel) was prepared from water glass (density 1.348 kg/l, 27.0% by weight of $SiO_2$, 8.05% by weight of $Na_2O$) and 45% strength sulphuric acid.

For this purpose, 45% strength by weight sulphuric acid and soda water glass were thoroughly mixed so that a reactant ratio corresponding to an excess of acid (0.25 N) and an $SiO_2$ concentration of 18.5% by weight was established. The resulting hydrogel was stored overnight (about 12 h) and then crushed to a particle size of about 1 cm. It was washed with demineralized water at 30-50° C. until the conductivity of the wash water was below 5 mS/cm.

Silica 2 (Hydrogel)

The hydrogel prepared as described above was aged with addition of ammonia at pH 9 and 80° C. for 10-12 hours and then adjusted to pH 3 with 45% strength by weight sulphuric acid. The hydrogel then had a solids content of 34-35%. It was then coarsely milled on a pinned-disc mill (Alpine type 1602) to a particle size of about 150 μm. The hydrogel had a residual moisture content of 67%.

The data of silica 2 were stated in Table 1.

Silica 3a:

Silica 2 was dried by means of a spin-flash dryer (Anhydro A/S, APV, type SFD47, $T_{in}$=350° C., $T_{out}$=130° C.) so that it had a final moisture content of about 2% after drying.

The data of silica 3a were stated in Table 1.

Silica 3b:

The hydrogel prepared as described above was further washed at about 80° C. until the conductivity of the wash water was below 2 mS/cm and was dried in a through-circulation drying oven (Fresenberger POH 1600.200) at 160° C. to a residual moisture content of <5%. In order to achieve a more uniform metering behaviour and milling result, the xerogel was precomminuted to a particle size of <100 μm (Alpine AFG 200).

The data of silica 3b were stated in Table 1.

Silica 3c:

The hydrogel prepared as described above was aged with addition of ammonia at pH 9 and 80° C. for 4 hours, then adjusted to about pH 3 with 45% strength by weight sulphuric acid and dried in a through-circulation drying oven (Fresenberger POH 1600.200) at 160° C. to a residual moisture content of <5%. In order to achieve a more uniform metering behaviour and milling result, the xerogel was precomminuted to a particle size of <100 μm (Alpine AFG 200).

The data of silica 3c were stated in Table 1.

TABLE 1

| Physicochemical data of the unmilled starting materials | | | | | | |
|---|---|---|---|---|---|---|
| | | Silica 1 | Silica 2 | Silica 3a | Silica 3b | Silica 3c |
| Particle size distribution by means of laser diffraction (Horiba LA 920) | | | | | | |
| $d_{50}$ | [μm] | 22.3 | n.d. | n.d. | n.d. | n.d. |
| $d_{99}$ | [μm] | 85.1 | n.d. | n.d. | n.d. | n.d. |
| $d_{10}$ | [μm] | 8.8 | n.d. | n.d. | n.d. | n.d. |
| Particle size distribution by means of sieve analysis | | | | | | |
| >250 μm | % | n.d. | n.d. | n.d. | 0.0 | 0.2 |
| >125 μm | % | n.d. | n.d. | n.d. | 1.06 | 2.8 |
| >63 μm | % | n.d. | n.d. | n.d. | 43.6 | 57.8 |
| >45 μm | % | n.d. | n.d. | n.d. | 44.0 | 36.0 |
| <45 μm | % | n.d. | n.d. | n.d. | 10.8 | 2.9 |
| Moisture | % | 4.8 | 67% | <3% | <5% | <5% |
| pH value | — | 6.7 | n.d. | n.d. | n.d. | n.d. |

n.d. = not determined

Examples 1-3

Milling According to the Invention

For preparation for the actual milling with superheated steam, a fluidized-bed opposed jet mill according to FIGS. 1, 2*a* and 3*a* was first heated to a mill exit temperature of about 105° C. via the two heating nozzles 5*a* (only one of which was shown in FIG. 1) through which hot compressed air at 10 bar and 160° C. was passed.

For depositing the milled material, a filter unit (not shown in FIG. 1) was connected downstream of the mill, the filter housing of which filter unit was heated in the lower third indirectly via attached heating coils by means of 6 bar saturated steam, likewise for preventing condensation. All apparatus surfaces in the region of the mill, of the separation filter and of the supply lines for steam and hot compressed air were specially insulated.

After the desired heat-up temperature had been reached, the supply of hot compressed air to the heating nozzles was switched off and the supply of superheated steam (38 bar (abs), 330° C.) to the three milling nozzles was started.

For protecting the filter material used in the separation filter and for establishing a certain residual water content of, preferably, 2 to 6% in the milled material, water was sprayed into the milling chamber of the mill via a compressed-air-operated binary nozzle in the start phase and during the milling, depending on the mill exit temperature.

The product feed was begun when the relevant process parameters (cf. Table 2) were constant. The feed rate was regulated as a function of the resulting classifier stream. The classifier stream regulates the feed rate in such a way that about 70% of the nominal flow cannot be exceeded.

A speed-controlled rotary-vane feeder which meters the feed material from a storage container via a synchronous lock serving as a barometric closure into the milling chamber under superatmospheric pressure acts as feed member (4).

The comminution of the coarse material was effected in the expanding vapour jets (milling gas). Together with the let-down milling gas, the product particles ascend in the centre of the mill container to the classifying wheel. Depending on the set classifier speed and amount of milling vapour (cf. Table 1), the particles which have sufficient fineness pass together with the milling vapour into the fines outlet and from there into the downstream separation system, while particles which were too coarse pass back into the milling zone and were subjected to further comminution. The discharge of the fines separated off from the separation filter into the subsequent storage and packing was effected by means of a rotary-vane feeder.

The milling pressure of the milling gas which prevails at the milling nozzles and the amount of milling gas resulting therefrom in combination with the speed of the dynamic paddle wheel classifier determine the fineness of the particle distribution function and the oversize limit.

The relevant process parameters are shown in Table 2, and the product parameters in Table 3:

TABLE 2

| | | Example | | | | |
|---|---|---|---|---|---|---|
| | | Example 1 | Example 2 | Example 3a | Example 3b | Example 3c |
| Starting material | | Silica 1 | Silica 2 | Silica 3a | Silica 3b | Silica 3c |
| Nozzle diameter | [mm] | 2.5 | 2.5 | 2.5 | 2.5 | 2.5 |
| Nozzle type | | Laval | Laval | Laval | Laval | Laval |
| Number | [units] | 3 | 3 | 3 | 3 | 3 |
| Internal mill pressure | [bar abs.] | 1.306 | 1.305 | 1.305 | 1.304 | 1.305 |
| Entry pressure | [bar abs.] | 37.9 | 37.5 | 36.9 | 37.0 | 37.0 |
| Entry temperature | [° C.] | 325 | 284 | 327 | 324 | 326 |
| Mill exit temperature | [° C.] | 149.8 | 117 | 140.3 | 140.1 | 139.7 |
| Classifier speed | [$min^{-1}$] | 5619 | 5500 | 5491 | 5497 | 5516 |
| Classifier current | [A %] | 54.5 | 53.9 | 60.2 | 56.0 | 56.5 |
| Dip tube diameter | [mm] | 100 | 100 | 100 | 100 | 100 |

TABLE 3

| | | Example 1 | Example 2 | Example 3a | Example 3b | Example 3c |
|---|---|---|---|---|---|---|
| $d_{50}$[1)] | nm | 125 | 106 | 136 | 140 | 89 |
| $d_{90}$[1)] | nm | 275 | 175 | 275 | 250 | 200 |
| $d_{99}$[1)] | nm | 525 | 300 | 575 | 850 | 625 |
| BET surface area | $m^2/g$ | 122 | 354 | 345 | 539 | 421 |
| $N_2$ pore volume | ml/g | n.d. | 1.51 | 1.77 | 0.36 | 0.93 |
| Average pore size | nm | n.d. | 17.1 | 20.5 | 2.7 | 8.8 |
| DBP (anhydrous) | g/100 g | 235 | 293 | 306 | 124 | 202 |
| Tamped density | g/l | 42 | 39 | 36 | 224 | 96 |
| Loss on drying | % | 4.4 | 6.1 | 5.5 | 6.3 | 6.4 |

[1)]Determination of the particle size distribution by means of transmission electron microscopy (TEM) and image analysis German patent application DE 102006048850 filed Oct. 16, 2006, and U.S. provisional patent application Ser. No. 60/940,615, file May 29, 2007, are incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. Amorphous pulverulent solids having a median particle size $d_{50}$ (TEM) of <1.5 μm and/or a $d_{90}$ value (TEM) of <2 μm and/or a $d_{99}$ value (TEM) of <2 μm.

2. The amorphous solids according to claim 1, which comprise a gel or a particulate solid containing aggregates and/or agglomerates.

3. The amorphous solids according to claim 1, which are silica gels which additionally have a pore volume of 0.2 to 0.7 ml/g.

4. The amorphous solids according to claim 1, which are silica gels which additionally have a pore volume of 0.8 to 1.5 ml/g.

5. The amorphous solids according to claim 1, which are silica gels which additionally have a pore volume of 1.5 to 2.1 ml/g.

6. A coating system, comprising: an amorphous solid according to claim 1.

* * * * *